United States Patent
Kato et al.

(10) Patent No.: US 10,719,496 B2
(45) Date of Patent: Jul. 21, 2020

(54) COMPUTER SYSTEM AND DATA PROCESSING METHOD

(71) Applicant: Hitachi, Ltd., Tokyo (JP)

(72) Inventors: Yutaro Kato, Tokyo (JP); Takashi Suzuki, Tokyo (JP); Toshiyuki Hasegawa, Tokyo (JP); Nobuyuki Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 166 days.

(21) Appl. No.: 15/561,214

(22) PCT Filed: Jan. 29, 2016

(86) PCT No.: PCT/JP2016/052642
§ 371 (c)(1),
(2) Date: Sep. 25, 2017

(87) PCT Pub. No.: WO2017/130377
PCT Pub. Date: Aug. 3, 2017

(65) Prior Publication Data
US 2018/0067975 A1    Mar. 8, 2018

(51) Int. Cl.
G06F 17/00 (2019.01)
G06F 16/22 (2019.01)
G06F 16/2458 (2019.01)
G06F 16/2455 (2019.01)
G06F 16/00 (2019.01)

(52) U.S. Cl.
CPC ......... *G06F 16/2272* (2019.01); *G06F 16/00* (2019.01); *G06F 16/22* (2019.01); *G06F 16/2471* (2019.01); *G06F 16/24556* (2019.01)

(58) Field of Classification Search
None
See application file for complete search history.

(56) References Cited

U.S. PATENT DOCUMENTS

| | | | |
|---|---|---|---|
| 2011/0022512 A1 | 1/2011 | Johnson et al. | |
| 2011/0225122 A1* | 9/2011 | Denuit | G06F 16/178 707/634 |
| 2012/0290581 A1* | 11/2012 | Bonaguro | G06Q 30/00 707/740 |
| 2013/0290249 A1* | 10/2013 | Merriman | G06F 16/273 707/610 |

FOREIGN PATENT DOCUMENTS

WO    2015/072025 A1    5/2015

OTHER PUBLICATIONS

International Search Report of PCT/JP2016/052642 dated May 19, 2016.

* cited by examiner

*Primary Examiner* — Anhtai V Tran
(74) *Attorney, Agent, or Firm* — Mattingly & Malur, PC

(57) ABSTRACT

This computer system includes a plurality of nodes for forming a distributed KVS. The plurality of nodes have a plurality of key ranges to which upper-limit data amounts are set, each upper-limit data amounts being an upper limit of an amount of manageable data. When a new key range is created, the plurality of nodes lowers an upper-limit data amount of an existing key range so that the sum of an upper-limit data amount of the new key range and an upper-limit data amount of the existing key range does not exceed a maximum amount which is the amount based on the volume of the memory of the computer apparatus.

20 Claims, 49 Drawing Sheets

State transition information  800

| # | State | Executable operation |
|---|---|---|
| 1 | Initial state | Upper-limit data amount lowering operation<br>Upper-limit data amount raising operation |
| 2 | Upper-limit data amount lowering completion state | Upper-limit data amount raising operation |
| 3 | Upper-limit data amount raising completion state | Initialization operation |

State transition information 800

| # | State | Executable operation |
|---|---|---|
| 1 | Initial state | Upper-limit data amount lowering operation<br>Upper-limit data amount raising operation |
| 2 | Upper-limit data amount lowering completion state | Upper-limit data amount raising operation |
| 3 | Upper-limit data amount raising completion state | Initialization operation |

FIG. 5

Process control information  700

| Data type | Data |
|---|---|
| Last processing number | 100 |
| Current state | Upper-limit data amount raising state |

FIG. 6

COMPUTER SYSTEM AND DATA PROCESSING METHOD

TECHNICAL FIELD

The present invention generally relates to a distributed database formed by a plurality of computers.

BACKGROUND ART

In recent years, the amount of data processed in a computer system which executes applications using a Web has increased rapidly and various systems which improve data access performance by distributing data to a plurality of servers have been known. For example, in a RDBMS (Relational DataBase Management System), a method which splits data into predetermined ranges (for example, key ranges) and distributes the split data to a plurality of servers to thereby improve the access performance of the entire system has been known.

A NoSQL (Not Only SQL) database such as a KVS (Key Value Store) has been known as a system used in a cache server or the like. The KVS stores a plurality of records each having a pair of data (value) and a data identifier (key).

The KVS has various structures, such as a structure (memory store) in which data is stored in a volatile recording medium (for example, a memory) in which data can be accessed at a high speed, a structure (disk store) in which data is stored in a nonvolatile recording medium (for example, an SSD (Solid State Disk) or an HDD) having excellent data storage permanence, and a combination of the structures.

An in-memory KVS realizes faster data access than a disk-type KVS but has some drawbacks. First, due to physical restrictions or the like, the memory volume which can be mounted in one server of the in-memory KVS is smaller than an SSD or an HDD and the amount of data that can be stored in the in-memory KVS is smaller than the disk-type KVS. Second, since the memory is a volatile recording medium, data in the memory is erased when the server stops due to a certain failure.

An example of a system which overcomes the drawbacks is an in-memory distributed KVS (hereinafter, referred to as a distributed KVS). The distributed KVS is a KVS which is formed on memories of servers included in a cluster which is formed by a plurality of servers. For the first drawback, it is possible to secure a memory volume which cannot be obtained by one server by integrating the memories on a plurality of servers. For the second drawback, it is possible to avoid erasure of data even when some servers stop by copying same data between a plurality of servers.

Each server which forms the distributed KVS manages a range which does not overlap the ranges of other servers and stores an aggregate (hereinafter, referred to as a partition) of data included in the range. Furthermore, each server stores the copies of partitions which are managed by other servers.

Since a special server such as a management server is not present or is multiplexed in the distributed KVS, a single point of failure does not occur in the distributed KVS. That is, even when a failure occurs in an arbitrary server, since other servers can continuously perform a process on the basis of the copied partitions, the computer system may not stop. Therefore, fault-tolerance of the distributed KVS is secured.

When the amount of data to be stored in the distributed KVS increases, a load applied to the server increases or the space for storing data disappears. One of the measures for solving the problem is a scale-out where a new server added to a cluster. In the scale-out, a process (hereinafter, referred to as a rebalancing process) of changing the range managed by the server is performed. Moreover, when data is distributed to some servers only in an unbalanced manner, the throughput of the system decreases. As one of the measures for solving the problem, the rebalancing process is performed to solve the data unbalance problem.

Techniques related to the above-mentioned rebalancing process are disclosed in PTL 1 and 2. In PTL 1, it is described that a rebalancing process can be realized by performing a process of preparing a new partition after rebalancing for an existing range and an existing partition corresponding to an existing range, copying data from the existing partition to the new partition, and switching access from the existing range and the existing partition corresponding to the existing range to the new range and the new partition corresponding to the new range after the copying is completed.

CITATION LIST

Patent Literature

[PTL 1]
U.S. Patent No. 2011/225122 (Specification)
[PTL 2]
WO 2015/72025

SUMMARY OF INVENTION

Technical Problem

However, in the conventional computer system that forms the distributed KVS, data copy performed during a rebalancing process may incur resource overflow. When the memory is extended or a data flow rate is monitored in order to cope with this problem, the system operation becomes complex and the system reliability may decrease. Therefore, an object of the present invention is to improve the operability and the reliability of a distributed KVS. Other objects will be apparent from the description of the embodiments.

Solution to Problem

A computer system according to an embodiment includes a plurality of computer apparatuses, wherein the plurality of computer apparatuses include a processor and a memory and execute a plurality of nodes for forming a distributed KVS, the plurality of nodes have a plurality of key ranges to which an upper-limit data amount, which is an upper limit of an amount of manageable data, is set, and when a new key range is created, the plurality of nodes lower an upper-limit data amount of an existing key range so that a sum of an upper-limit data amount of the new key range and an upper-limit data amount of the existing key range does not exceed a maximum amount, which is an amount based on a volume of the memory of the computer apparatus.

Advantageous Effects of Invention

According to the present invention, it is possible to improve the operability and the reliability of computer systems that form a distributed KVS.

BRIEF DESCRIPTION OF DRAWINGS

FIG. 5 is a diagram illustrating an example of state transition information.

FIG. 6 is a diagram illustrating an example of process control information.

DESCRIPTION OF EMBODIMENTS

Example 1

Figure 1:
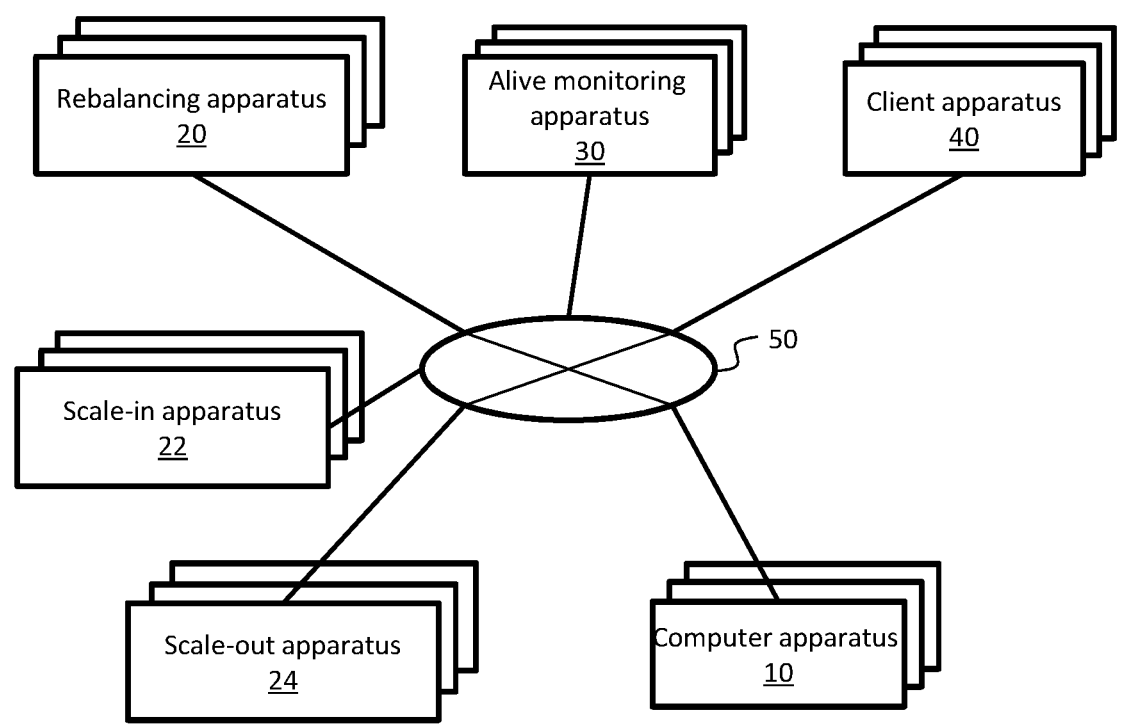
FIG. 1 is a diagram illustrating a configuration example of a computer system according to the present embodiment.

FIG. 1 illustrates a configuration example of a computer system according to the present embodiment.

A computer system 1 includes a rebalancing apparatus 20, a scale-in apparatus 22, a scale-out apparatus 24, an alive monitoring apparatus 30, a client apparatus 40, and a plurality of computer apparatuses 10, and these components are connected via a network 50 so as to be able to communicate bi-directionally.

The plurality of computer apparatuses 10 includes a plurality of nodes 110 (see FIG. 2), and the plurality of nodes 110 forms a distributed KVS in cooperation. Each node 110 manages a key range (sometimes referred to simply as a "range") indicating a partial range of the entire range of a key. The plurality of nodes 110 may manage the same key range in order to enhance fault-tolerance. Hereinafter, the plurality of computer apparatuses 10 is sometimes referred to as a "computer cluster".

The rebalancing apparatus 20 is an apparatus that performs a process (referred to as a "rebalancing process") of changing key ranges so that the amounts of data held by respective key ranges are equalized when unbalance occurs in the amounts of data held by respective key ranges. The scale-in apparatus 22 is an apparatus that performs a process (referred to as a "scale-in process") of deleting at least one nodes 110 from the plurality of nodes 110. The scale-out apparatus 24 is an apparatus that performs a process (referred to as a "scale-out process") of adding at least one nodes 110 to the plurality of nodes 110. The rebalancing apparatus 20, the scale-in apparatus 22, and the scale-out apparatus 24 may be a single apparatus.

The alive monitoring apparatus 30 is an apparatus that monitors the fate of each apparatus. For example, the alive monitoring apparatus 30 may transmit a PING message periodically to respective apparatuses and may determine that the apparatus is stopped unless a response is returned within an initial period (that is, if a time-out period has elapsed). The alive monitoring apparatus 30 may instruct an apparatus of a standby system corresponding to the apparatus which is determined to be in a stopping state to inherit the process.

The client apparatus 40 uses the distributed KVS formed by the plurality of computer apparatuses 10. For example, the client apparatus 40 can request a computer cluster to write, read, or delete data. A computer cluster having received a data write request may calculate a key from the data and write the key and the data to the node 110 that manages a range that includes the key. A computer cluster having received a data acquisition request may calculate a key from the data, read data corresponding to the key from the node 110 that manages a range that includes the key, and return the read data to the client apparatus 40. A similar process is performed for deletion.

Figure 2:
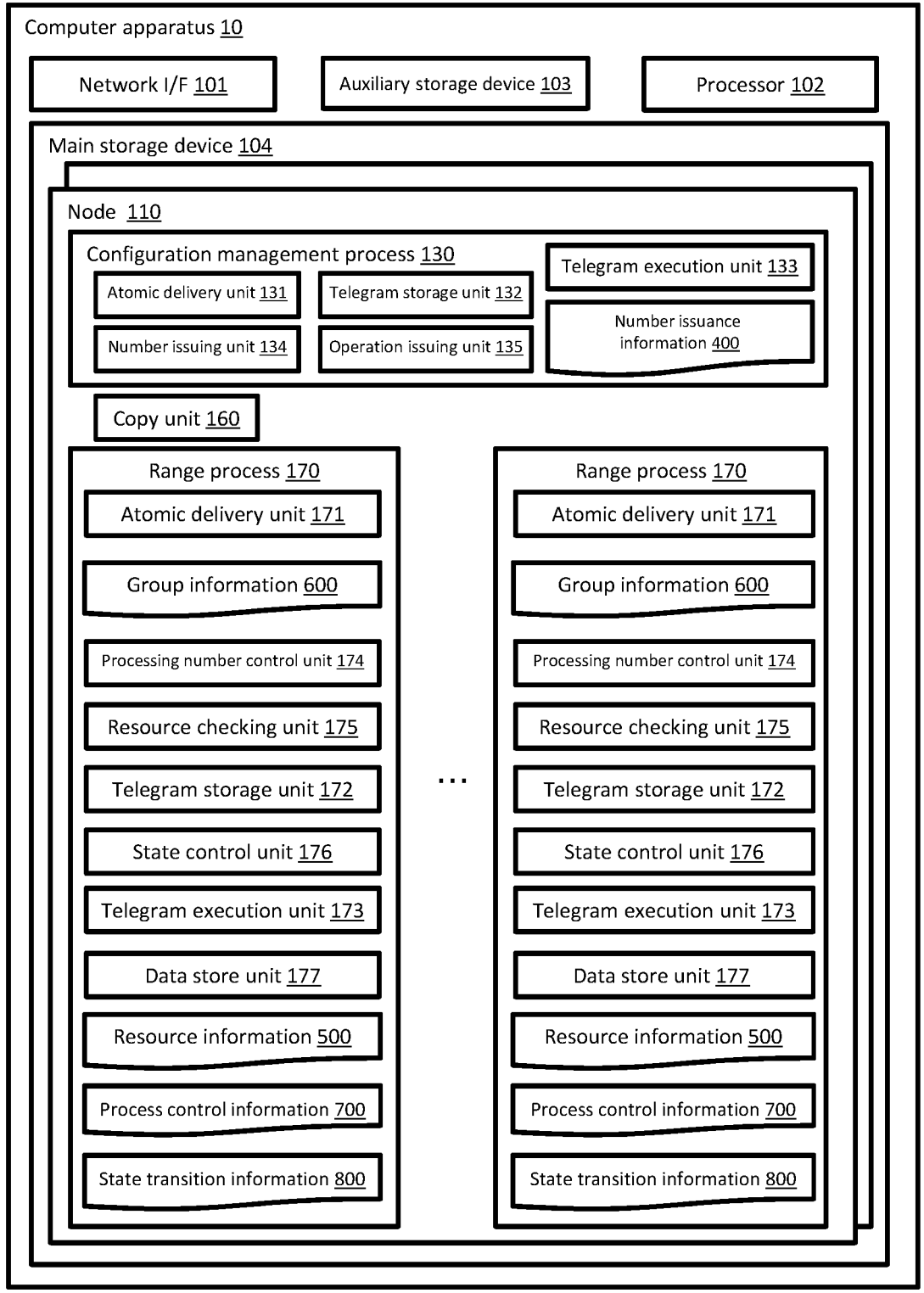
FIG. 2 is a diagram illustrating a configuration example of a computer apparatus.

FIG. 2 illustrates a configuration example of the computer apparatus 10.

The computer apparatus 10 includes a processor 102, a main storage device 104, an auxiliary storage device 103, and a network I/F device 101.

The processor 102 executes a program stored in the main storage device 104. The auxiliary storage device 103 stores various types of information. An example of the auxiliary storage device 103 is an HDD, an SSD, and the like. The network I/F device 101 is a device for allowing the computer apparatus 10 to perform communication with other apparatuses via the network 50. An example of the network I/F device 101 is an Ethernet card and the like. The main storage device 104 stores a program to be executed by the processor 102 and information necessary for execution of the program. An example of the main storage device 102 is SRAM, DRAM, and the like. In the present embodiment, although the distributed KVS is constructed in the main storage device 104, a disk store (not illustrated) which constructs the distributed KVS may be constructed in the auxiliary storage device 103.

The main storage device 104 stores a program for realizing the node 110. A plurality of nodes 110 may be present in one computer apparatus 10. The node 110 includes programs for realizing a configuration management process 130, a copy unit 160, and a plurality of range processes 170.

The configuration management process 130 may include a primitive delivery unit 131, a telegram storage unit 132, a telegram execution unit 133, a number issuing unit 134, an operation issuing unit 135, and number issuance information 400.

The range process 170 may include a primitive delivery unit 171, a processing number control unit 174, a resource checking unit 175, a telegram storage unit 172, a state control unit 176, a telegram execution unit 173, a data store unit 177, group information 600, resource information 500, process control information 700, and state transition information 800. Hereinafter, the program and information stored in the main storage device 104 will be described.

<Range Process>

The range process 170 is a processing unit that manages one range. The range process 170 is a system (also referred to as a state machine or an automaton) in which the behavior of a target is represented using a "state" and an "event", and stores a current state therein. When an event is input from the outside, the range process 170 performs "state transition" from the current state to the next state according to predetermined rules.

Here, when it is regarded that data for a key stored in KVS is "state", an operation such as updating of data for the key is "event", and a process of updating the data for the operation is "state transition", the KVS can be treated as an aggregate of the range processes 170 for respective keys.

However, when the aggregate of the range processes 170 of respective keys is used, the number of range processes 170 increases significantly, which is not practical. For example, when the data length of a key is 4 bytes, the number of keys which can be expressed by 4 bytes is $2^{32}$ and the number of necessary range processes 170 is approximately 4,200,000,000.

Therefore, it is preferable in the KVS to operate one range process 170 for respective aggregates of keys included in a specific range. A range indicates the range of hash values. A hash value is calculated from the key of each item of data, and the range process 170 that manages the range in which the calculated hash value stores the data. This method is referred to as a Consistent Hashing method. A Range method and a List method in addition to the above-mentioned method may be used.

When the distributed KVS is realized by the range process 170, a plurality of range processes 170 which copy mutual items of data need to execute the same behavior in order to maintain data consistency between the plurality of range processes 170. An aggregate of the range processes 170 which executes the same behavior in order to copy mutual items of data is referred to as a "group". For the range processes 170 belonging to a group to execute the same behavior, it is necessary to input the same event to all range processes 170 belonging to the group in the same order. Therefore, the atomic delivery unit 171 is used to determine the order of inputting events.

The atomic delivery units 171 of the range processes 170, which are of the same group, can communicate with each other. Information on the group is stored in the group information 600. For example, the atomic delivery unit 171 delivers the same telegram in the same order within the group using a distributed consensus algorithm. This delivery method is referred to as atomic delivery (sometimes referred to as total order broadcast or atomic broadcast).

The telegram execution unit 173 extracts a telegram from the telegram storage unit 172 and performs various processes corresponding to the telegram with respect to the data managed by the data store unit 177. The processes include, for example, a data updating, an upper-limit data amount lowering operation, an upper-limit data amount raising operation, and an initialization operation.

<Configuration Management Process>

The configuration management process 130 performs various operations on the basis of the telegram received from the alive monitoring apparatus 20, the rebalancing apparatus 20, or the like.

The primitive delivery unit 131 of the configuration management process 130 can communicate with the primitive delivery units 171 included in all configuration management processes 130 and delivers the telegram to all configuration management processes 130 primitively.

The telegram storage unit 132 temporarily stores the telegram which is primitively delivered by the primitive delivery unit 131 in a FIFO manner.

The telegram execution unit 133 extracts the telegram from the telegram storage unit 172 and performs various processes corresponding to the telegram. The processes include, for example, a configuration changing process and a numbering process. The details of the processes will be described later.

The number issuing unit 134 issues a processing number. The details will be described later.

The operation issuing unit 135 assigns a processing number to the telegram transmitted by a telegram transmitting unit 211 or the telegram execution unit 133 of the configuration management process 130.

Figure 3:
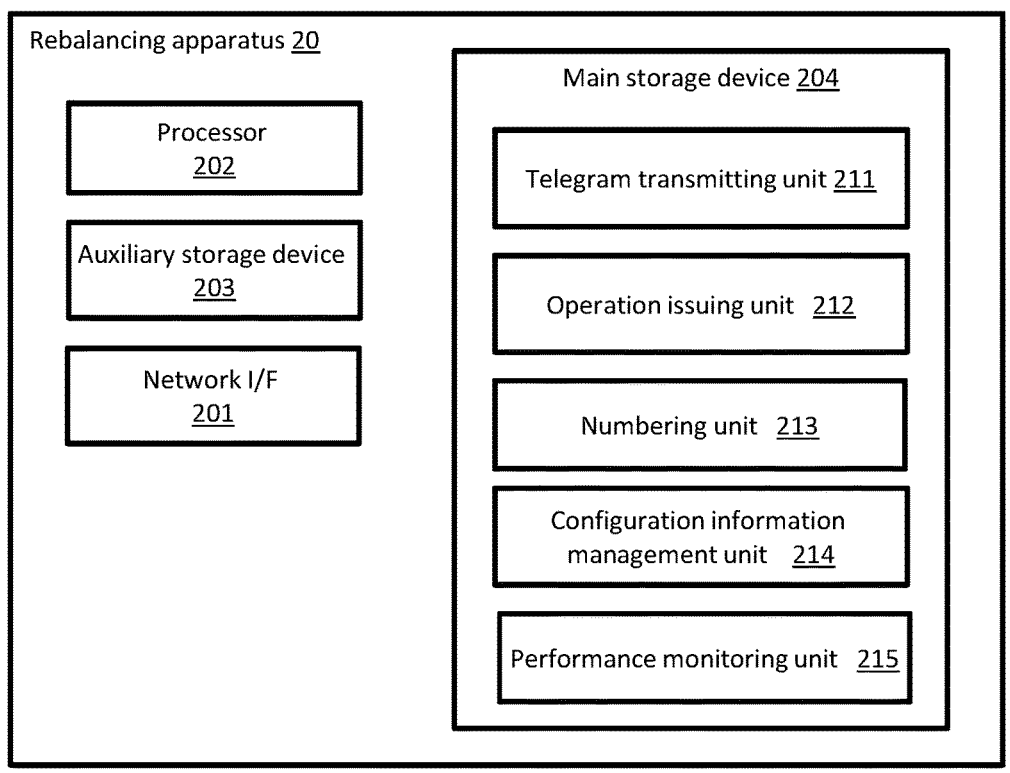
FIG. 3 is a diagram illustrating a configuration example of a rebalancing apparatus.

FIG. 3 illustrates a configuration example of the rebalancing apparatus 20.

The rebalancing apparatus 20 includes a processor 202, a main storage device 204, an auxiliary storage device 203, and a network I/F device 201.

The processor 202 executes a program stored in the main storage device 204. The auxiliary storage device 203 stores various items of information. An example of the auxiliary storage device 203 is an HDD, an SSD, and the like. The network I/F device 201 is a device for allowing the rebalancing apparatus 20 to perform communication with other apparatuses via the network 50. An example of the network I/F device 201 is an Ethernet card and the like. The main storage device 204 stores a program to be executed by the processor 202 and information necessary for execution of the program. An example of the main storage device 204 is SRAM, DRAM, and the like.

The main storage device 204 may store programs for realizing the functions of a configuration information management unit 214, a performance monitoring unit 215, a telegram transmitting unit 211, a numbering unit 213, and an operation issuing unit 212.

The configuration information management unit 214 manages configuration information on the configuration of the node 110 and the range process 170 included in the node 110.

The performance monitoring unit 215 periodically collects the performance index of each group. The performance monitoring unit 215 determines whether unbalance occurs in the performance indices of respective groups on the basis of the collection result. When it is determined that unbalance has occurred, the performance monitoring unit 215 makes the telegram transmitting unit 211 transmit the telegram related to the rebalancing process.

The telegram transmitting unit 211 transmits the telegram to the computer cluster in order to perform a rebalancing process. The telegram may be an initialization telegram, an upper-limit data amount raising telegram, an upper-limit data amount lowering telegram, or a telegram for operating the telegram or the range process 170, for example. An operation of the range process 170 is a blank range creation operation, a range splitting operation, a range copying operation, and a range merging operation, for example. The details will be described later.

A numbering telegram is a telegram for requesting the computer cluster to assign processing numbers. The numbering telegram may be issued by the numbering unit 213 to be described later.

The upper-limit data amount raising telegram is a telegram for requesting the computer cluster to raise the upper-limit data amount of a designated key range.

The upper-limit data amount lowering telegram is a telegram for requesting the computer cluster to lower the upper-limit data amount of a designated key range.

A configuration change telegram is a telegram which is transmitted when the alive monitoring apparatus 30 has detected shutdown of the node 110 and which requests separation of the shutdown node 110 from the computer cluster.

A data update telegram is a telegram for requesting the computer cluster to update (write, read, move, delete, or the like) designated data.

The initialization telegram is a telegram for requesting the computer cluster to initialize the state in the state transition information 800 prior to the start of the rebalancing process.

The numbering unit 213 issues a telegram (a "numbering telegram") for requesting the computer cluster to assign numbers. The numbering unit 213 manages the processing numbers assigned from the computer cluster with respect to the numbering telegram. With this processing number and the operation issuing unit 212, for example, even when the rebalancing apparatus 20 of a current system and the rebalancing apparatus 20 of a standby system transmit the same telegram to the computer cluster due to a certain abnormal state, for example, it is possible to prevent the computer cluster from executing the same telegram in a duplicated manner.

Figure 4:
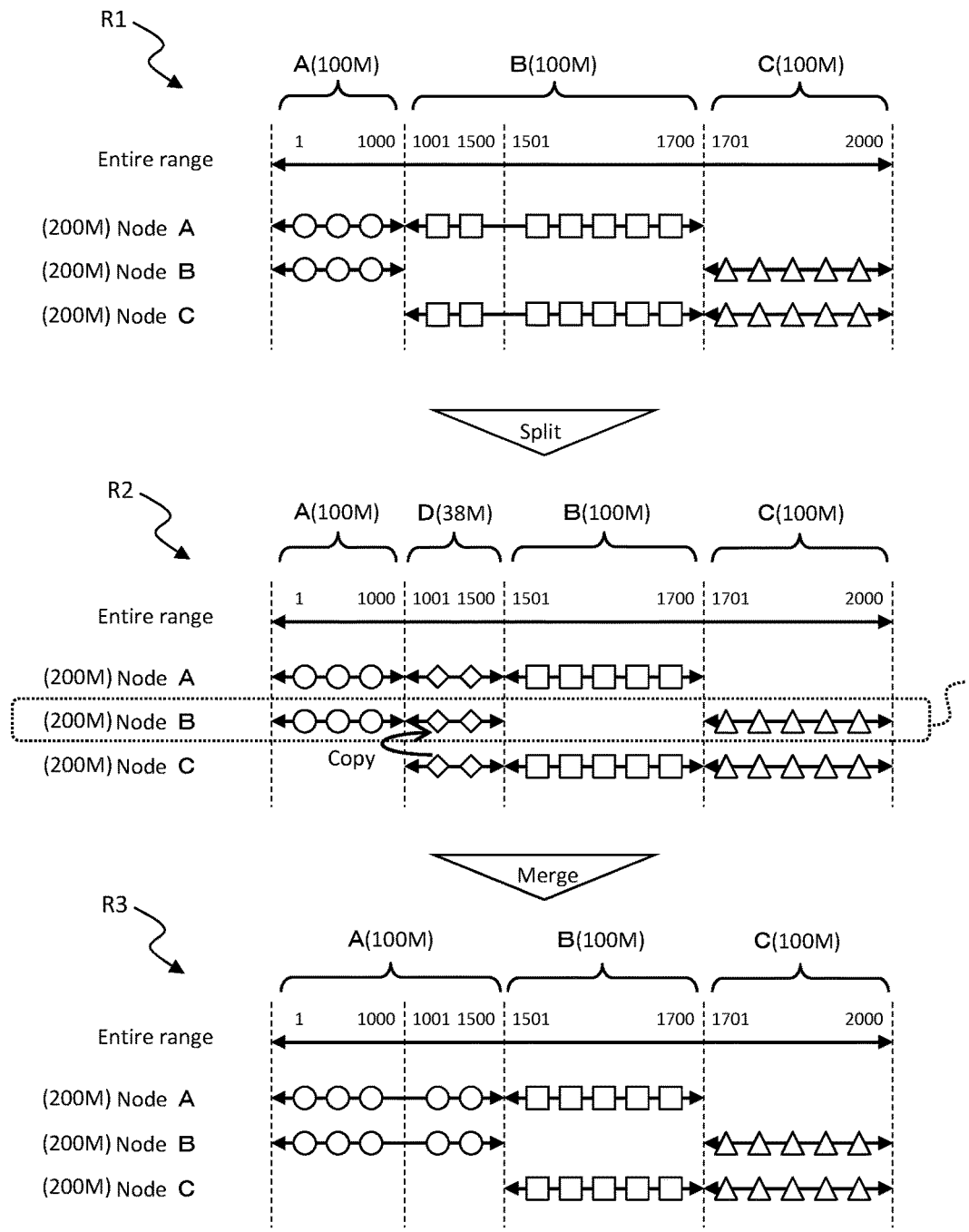
FIG. 4 is a diagram for describing an outline of a rebalancing process.

FIG. 4 is a diagram for describing an outline of the rebalancing process.

In this example, it is assumed that the hash value is calculated between 1 to 2000 and all items of data treated by the system can be stored in the range of 1 to 2000. Here, a distributed KVS that processes operation such as a data update process or the like using a group A that processes data represented by circles included in the range $\alpha$ of 1 to 1000, a group B that processes data represented by rectangles in the range $\beta$ of 1001 to 1700, and a group C that processes data represented by triangles included in the range $\gamma$ of 1701 to 2000 will be described. Moreover, it is assumed that a maximum amount of data that each node can store is "200 MB" and the upper-limit data amount of the ranges $\alpha$, $\beta$, and $\gamma$ is "100 MB".

As indicated by R1, since the group A processes three items of data included in the range $\alpha$, and the respective items of data are multiplexed by the data store units 177 of the range processes belonging to the group A present on the nodes A and B, the group A stores a total of 6 items of data (6=3×2).

Similarly, since the group B processes seven items of data included in the range $\beta$, and the respective items of data are multiplexed by the data store units of the range processes belonging to the group B present on the nodes A and C, the group B stores a total of 14 items of data (14=7×2).

Similarly, since the group C processes five items of data included in the range $\gamma$, and the respective items of data are multiplexed by the data store units of the range processes belonging to the group C present on the nodes B and C, the group C stores a total of 10 items of data (10=5×2).

Due to this, unbalance occurs in the loads on the respective groups. Therefore, a process of rebalancing the loads by performing steps of creating a moving group, splitting the group, moving the moving group, merging the split groups, and deleting the moving group in order to remove the unbalance by narrowing the range $\beta$ and widening the range $\alpha$.

First, a moving group D that manages a blank range and is used temporarily is created in a node that includes the group B as preparation for a group splitting operation. Specifically, the group D is created in the nodes A and C since the nodes A and C include the range belonging to the group B.

Subsequently, a group splitting operation is performed to update the range β of the group B and the range δ of the moving group D. When the group splitting operation is performed, data which is stored in the group B in the range newly managed by the moving group D is moved from the group B to the moving group D. The items of data managed by the moving group D are represented by rhombuses in the drawing.

Subsequently, as indicated by R2, in order to move the moving group D, first, the range process belonging to the moving group D stored in the node C and the data stored in the range process are copied to the node B and the copied range process belongs to the moving group D (see "Copy" in the drawing). Here, a process of copying a range process belonging to a certain group to another node so that the range processes belong to the same group is referred to as an in-group process copying process.

In this case, the copied data of the group D (the range δ) as well as the data of the original groups A (the range α) and C (the range γ) are present in the node B. That is, the sum of the upper-limit data amount "100 MB" of the range α, the upper-limit data amount "100 MB" of the range γ, and the upper-limit data amount "38 MB" of the range δ exceeds the maximum amount of data "200 MB" that the node B can store. In the present embodiment, such a problem is prevented.

Subsequently, range processes that are obstacles to the group merging operation and belong to the moving group D present on the node C are deleted. Here, a process of deleting some range processes belonging to a certain group may be referred to as an in-group process deletion process.

Subsequently, as indicated by R3, a group merging operation is performed to update the range α of the group A and the range δ of the moving group D. Moreover, when the group merging operation is performed, data which is stored in the moving group D in the range newly managed by the group A is moved from the moving group D to the group A.

In this way, in R3 as compared to R1, the range α of the group A is changed from "1 to 1000" to "1 to 1500", the range β of the group B is changed from "1001 to 1700" to "1501 to 1700", and the numbers of items of data stored in the groups A and B are equalized to 10 (=5×2).

Here, the group splitting operation and the group merging operation are realized by a process called a "range updating process". Specifically, the group splitting operation is realized by updating the range β managed by the group B and the range δ managed by the moving group D from "1001 to 1700" and "NULL" to "1501 to 1700" and "1001 to 1501", respectively. Moreover, the group merging operation is realized by updating the range δ managed by the moving group D and the range α managed by the group A from "1001 to 1501" and "1 to 1000" to "NULL" and "1 to 1500", respectively.

FIG. 5 illustrates an example of the state transition information 800.

The state transition information 800 includes information on the correlation between the state of the range process 170 and an operation that the range process 170 can executed in that state.

The example of FIG. 5 illustrates that an operation (an upper-limit data amount raising operation) of raising the upper-limit data amount and an operation (an upper-limit data amount lowering operation) of lowering the upper-limit data amount can be executed in an initial state. Similarly, the example illustrates that the upper-limit data amount raising operation only can be executed in a state (an upper-limit data amount lowering state) in which the upper-limit data amount lowering operation is completed and an initialization operation only can be executed in a state (an upper-limit data amount raising state) in which the upper-limit data amount raising operation is completed.

In this way, it is possible to maintain consistency of the upper-limit data amount raising and lowering operation in a series of processes (for example, one rebalancing process).

FIG. 6 illustrates an example of the process control information 700.

The process control information 700 includes information on a processing number (the last processing number) of the last telegram that the range process 170 has received from the rebalancing apparatus 20 or the like and a current state of the range process 170.

As described above, the last processing number is used for preventing duplicate execution of the same telegram.

The current state of the range process 170 is used for determining an operation that the range process 170 can execute currently. The value that the current state of the node 110 takes may be a value that is registered in the state of the node 110 of the state transition information 800.

Figure 7:
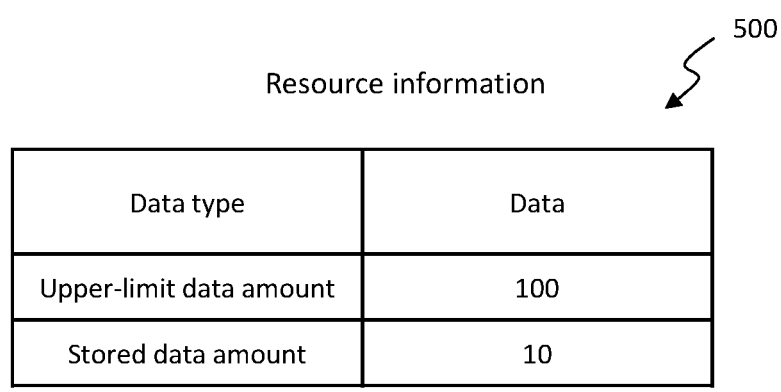
FIG. 7 is a diagram illustrating an example of resource information.

FIG. 7 illustrates an example of the resource information 500.

The resource information 500 includes information on a current upper-limit data amount of a range and an amount of data (stored data amount) that is currently stored in the range.

Figure 8:
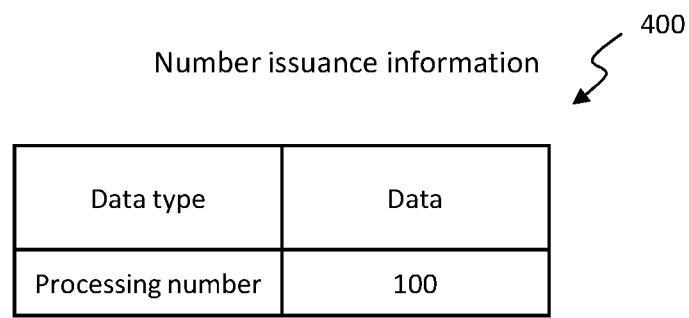
FIG. 8 is a diagram illustrating an example of number issuance information.

FIG. 8 illustrates an example of the number issuance information 400.

The number issuance information 400 includes information on a processing number that the number issuing unit 134 of the configuration management process 130 has issued to the rebalancing apparatus 20 or the like.

Figure 9:
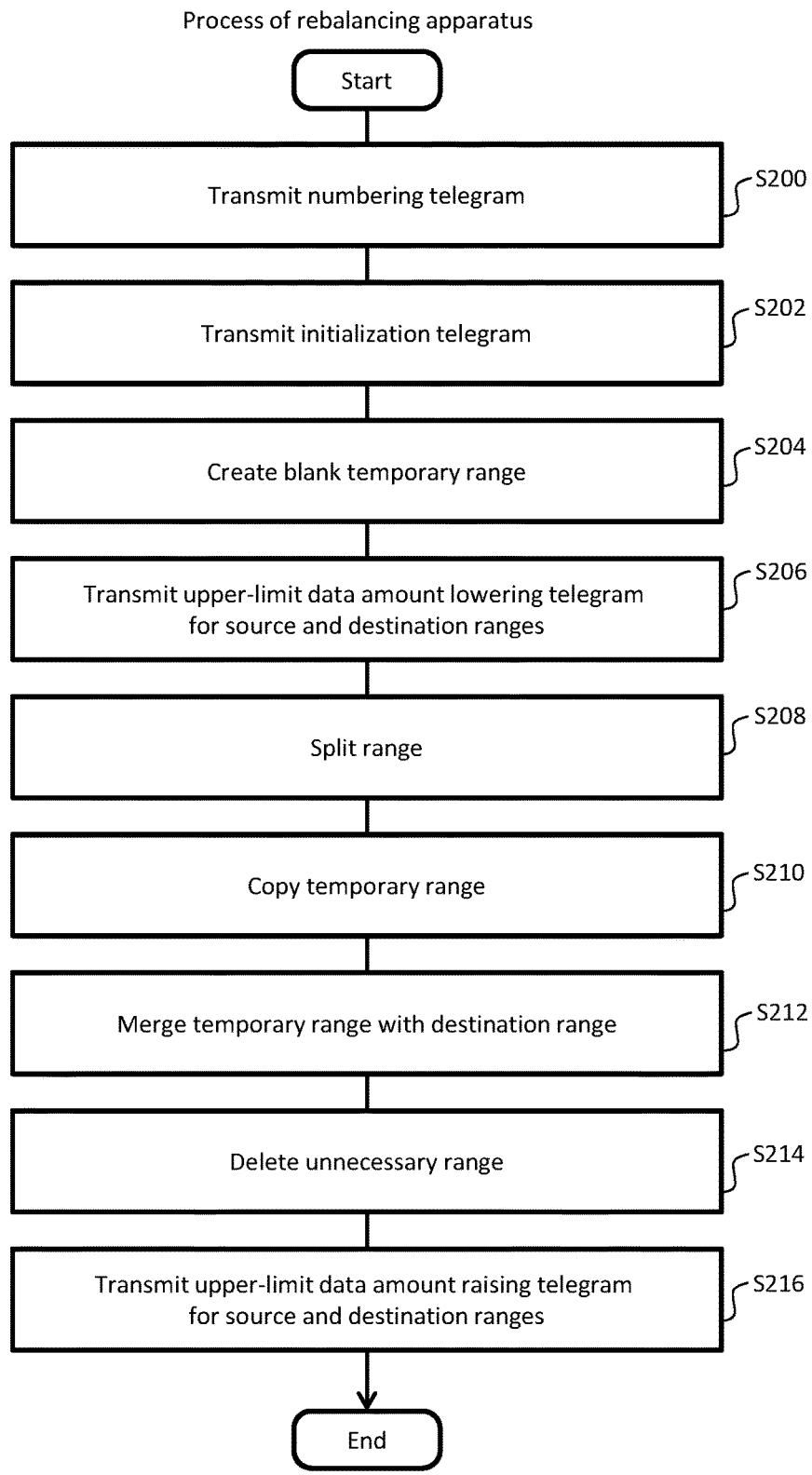
FIG. 9 is a flowchart illustrating a processing example of the rebalancing apparatus.

FIG. 9 is a flowchart illustrating a processing example of the rebalancing apparatus 20.

The rebalancing apparatus 20 performs the following processes when the performance monitoring unit 215 determines that rebalance is required.

(S200) The numbering unit 213 transmits a numbering telegram to the configuration management process 130. The numbering unit 213 receives a processing number corresponding to the rebalancing process from the configuration management process 130 and registers the processing number. This processing number may be assigned to all telegrams in the following rebalancing processes by the operation issuing unit 212. After that, the processing proceeds to S202.

(S202) The telegram transmitting unit 211 transmits an initialization telegram to the range process 170. After that, the processing proceeds to S204.

(S204) The telegram transmitting unit 211 creates a blank temporary range in the node 110 that manages a source range in cooperation with the range process 170. After that, the processing proceeds to S206.

(S206) The telegram transmitting unit 211 transmits an upper-limit data amount lowering telegram for the source range and the destination range to the range process 170. After that, the processing proceeds to S208.

(S208) The telegram transmitting unit 211 performs a range split to a source range in cooperation with the range process 170. For example, the operation issuing unit moves a portion of data stored in the source range to the temporary range created in S204.

(S210) The telegram transmitting unit 211 copies the temporary range to the node 110 that manages the destination range in cooperation with the range process 170. After that, the processing proceeds to S212.

(S212) The telegram transmitting unit 211 merges the temporary range with the destination range in cooperation with the range process 170. After that, the processing proceeds to S214.

(S214) The telegram transmitting unit 211 deletes the temporary range (an unnecessary range) in cooperation with the range process 170. After that, the processing proceeds to S216.

(S216) The telegram transmitting unit 211 transmits an upper-limit data amount raising telegram for the source range and the destination range to the range process 170. In this way, this process ends.

According to the rebalancing process described above, it is possible to prevent the amount of data managed by the node 110 from exceeding the maximum amount of data that the node 110 can manage. A specific example of this process is illustrated in FIGS. 18A to 18I and FIGS. 21A to 21H.

Figure 10:
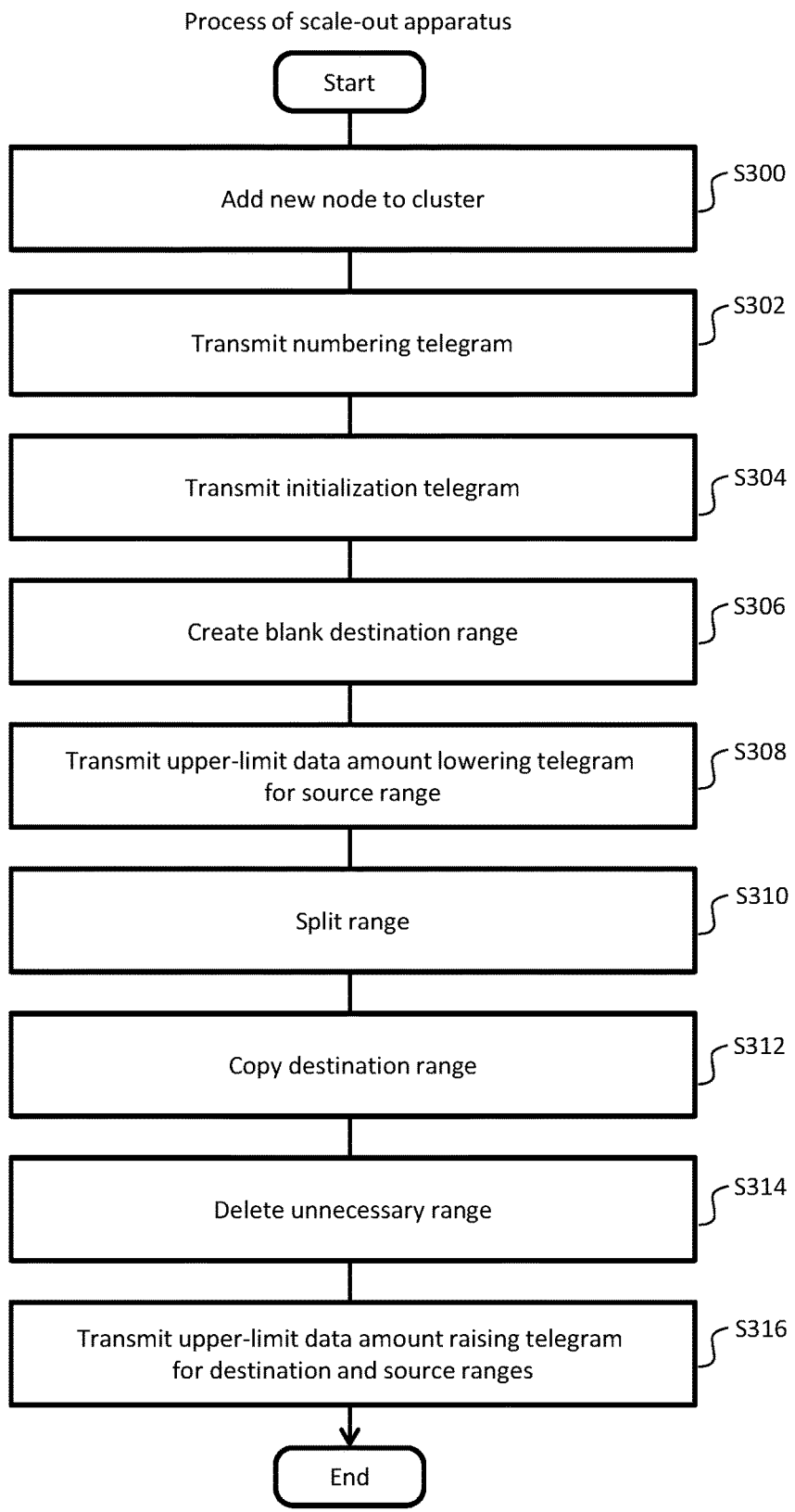
FIG. 10 is a flowchart illustrating a processing example of a scale-out apparatus.

FIG. 10 is a flowchart illustrating a processing example of the scale-out apparatus 24.

The scale-out apparatus 24 performs the following processes when a new node 110 is added to a computer cluster (S300).

(S302) The numbering unit 213 transmits a numbering telegram to the configuration management process 130. The numbering unit 213 receives a processing number corresponding to the scale-out process from the configuration management process 130 and registers the processing number. This processing number may be assigned to all telegrams in the following scale-out processes by the operation issuing unit 212. After that, the processing proceeds to S304.

(S304) The telegram transmitting unit 211 transmits an initialization telegram to the range process 170. After that, the processing proceeds to S306.

(S306) The telegram transmitting unit 211 generates a blank destination range in the node 110 that manages the source range in cooperation with the range process 170. After that, the processing proceeds to S308.

(S308) The telegram transmitting unit 211 transmits an upper-limit data amount lowering telegram for the source range to the range process 170. After that, the processing proceeds to S310.

(S310) The telegram transmitting unit 211 performs a range split to the source range in cooperation with the range process 170. For example, the operation issuing unit 212 moves a portion of data stored in the source range to the destination range created in S306. After that, the processing proceeds to S312.

(S312) The telegram transmitting unit 211 copies the destination range to a new node 110 in cooperation with the range process 170. Moreover, the operation issuing unit 212 copies the destination range to the new node 110 in cooperation with the range process 170.

(S314) The telegram transmitting unit 211 deletes a range (an unnecessary range) that becomes surplus due to copying of the range in S312 in cooperation with the range process 170. After that, the processing proceeds to S214.

(S316) The telegram transmitting unit 211 transmits an upper-limit data amount raising telegram for the source range and the destination range to the range process 170. In this way, this process ends.

According to the scale-out process described above, it is possible to prevent the amount of data managed by the node 110 from exceeding the maximum amount of data that the node 110 can manage. A specific example of this process is illustrated in FIGS. 19A to 19H.

Figure 11:
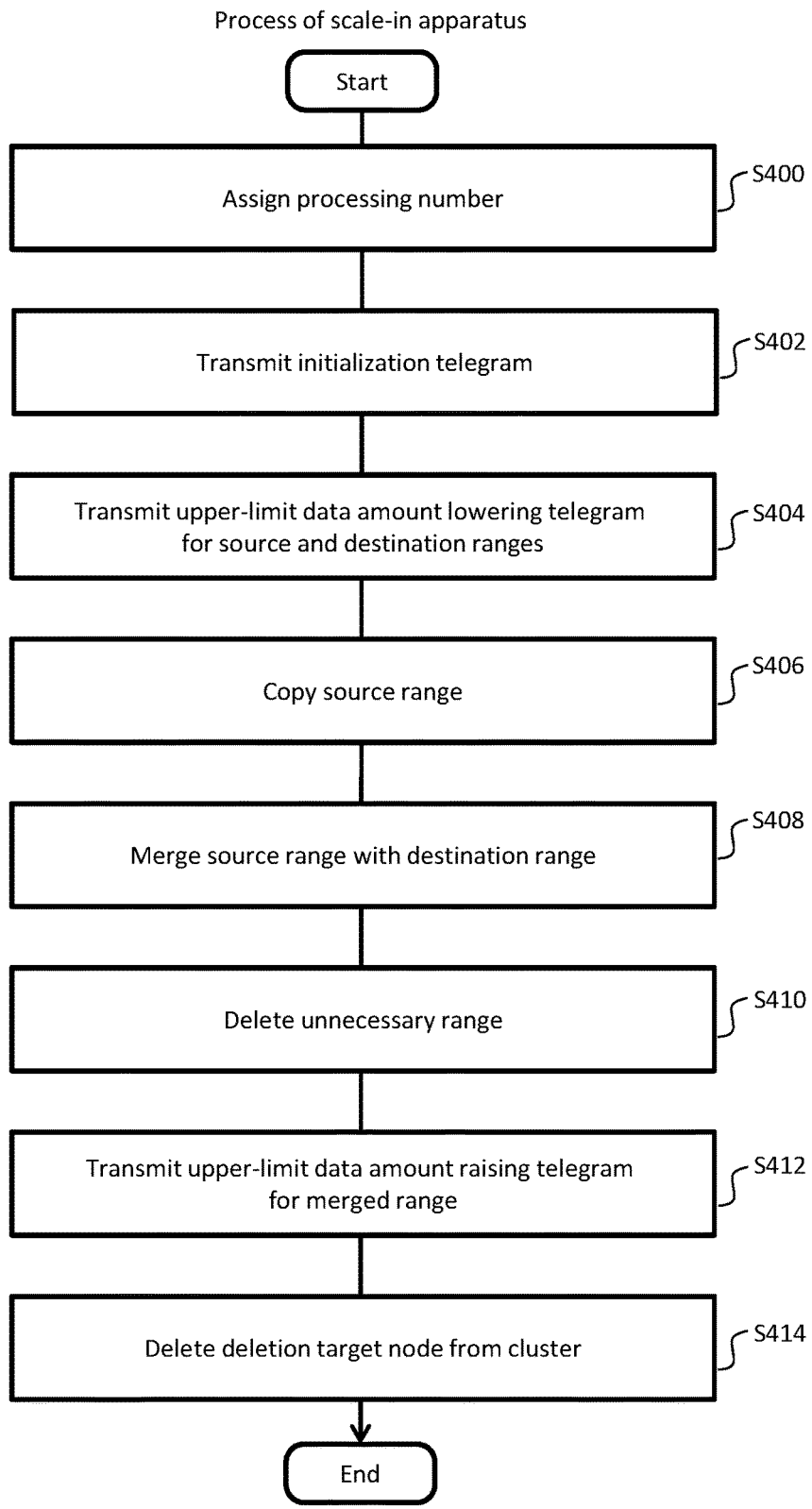
FIG. 11 is a flowchart illustrating a processing example of a scale-in apparatus.

FIG. 11 is a flowchart illustrating a processing example of the scale-in apparatus 22.

The scale-in apparatus 22 performs the following processes when an existing node 110 is deleted from the computer cluster.

(S400) The numbering unit 213 transmits a numbering telegram to the configuration management process 130. The numbering unit 213 receives a processing number corresponding to the scale-in process from the configuration management process 130 and registers the processing number. This processing number may be assigned to all telegrams in the following scale-in process by the operation issuing unit 212. After that, the processing proceeds to S402.

(S402) The telegram transmitting unit 211 transmits an initialization telegram to the range process 170. After that, the processing proceeds to S404.

(S404) The telegram transmitting unit 211 transmits an upper-limit data amount lowering telegram for the source range and the destination range to the range process 170. After that, the processing proceeds to S406.

(S406) The telegram transmitting unit 211 copies the source range to the node 110 that manages the destination range in cooperation with the range process 170. After that, the processing proceeds to S408.

(S408) The telegram transmitting unit 211 merges the destination range with the destination range in cooperation with the range process 170. After that, the processing proceeds to S410.

(S410) The telegram transmitting unit 211 deletes the source range (an unnecessary range). After that, the processing proceeds to S412.

(S412) The telegram transmitting unit 212 transmits an upper-limit data amount raising telegram for the destination range to the range process 170. After that, the processing proceeds to S414.

(S414) The telegram transmitting unit 211 deletes the deletion target node 110 from the computer cluster. In this way, this process ends.

According to the scale-in process described above, it is possible to prevent the amount of data managed by the node 110 from exceeding the maximum amount of data that the node 110 can manage. A specific example of this process is illustrated in FIGS. 20A to 20G.

Figure 12:
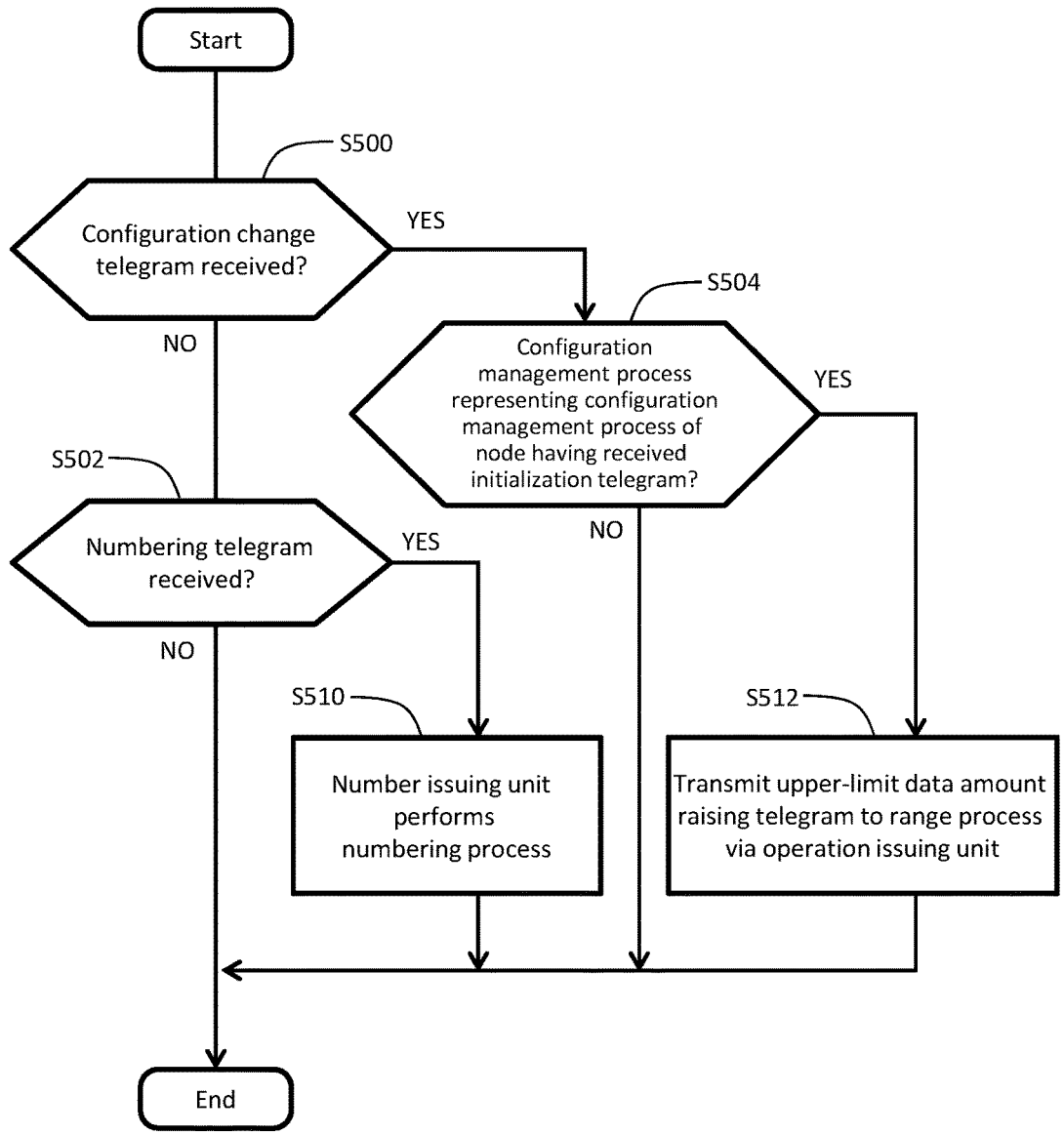
FIG. 12 is a flowchart illustrating a processing example of a telegram execution unit of a configuration management process.

FIG. 12 is a flowchart illustrating a processing example of the telegram execution unit 133 of the configuration management process 130.

(S500) The telegram execution unit 133 determines whether the received telegram is a configuration change telegram. The processing proceeds to S504 when the determination result is "YES" and proceeds to S502 when the determination result is "NO".

(S502) The telegram execution unit 133 determines whether the received telegram is a numbering telegram. The processing proceeds to S510 when the determination result is "YES" and this process ends when the determination result is "NO".

<Case of Configuration Change Telegram>

(S504) The telegram execution unit 133 determines whether the configuration change telegram is a representative configuration management process 130 which is the configuration management process 130 of the node 110 including the range process 170 that has received the initialization telegram. The processing proceeds to S512 when the determination result is "YES" and this process ends when the determination result is "NO".

(S512) The telegram execution unit 133 transmits an upper-limit data amount raising telegram to the range process 170 and this process ends. When the telegram is transmitted, a processing number may be assigned by the operation issuing unit 135.

<Case of Numbering Telegram>

(S510) The number issuing unit 134 issues a processing number corresponding to the received numbering telegram and this process ends. The details of a processing of the number issuing unit 134 will be described later (see FIG. 13).

Figure 13:
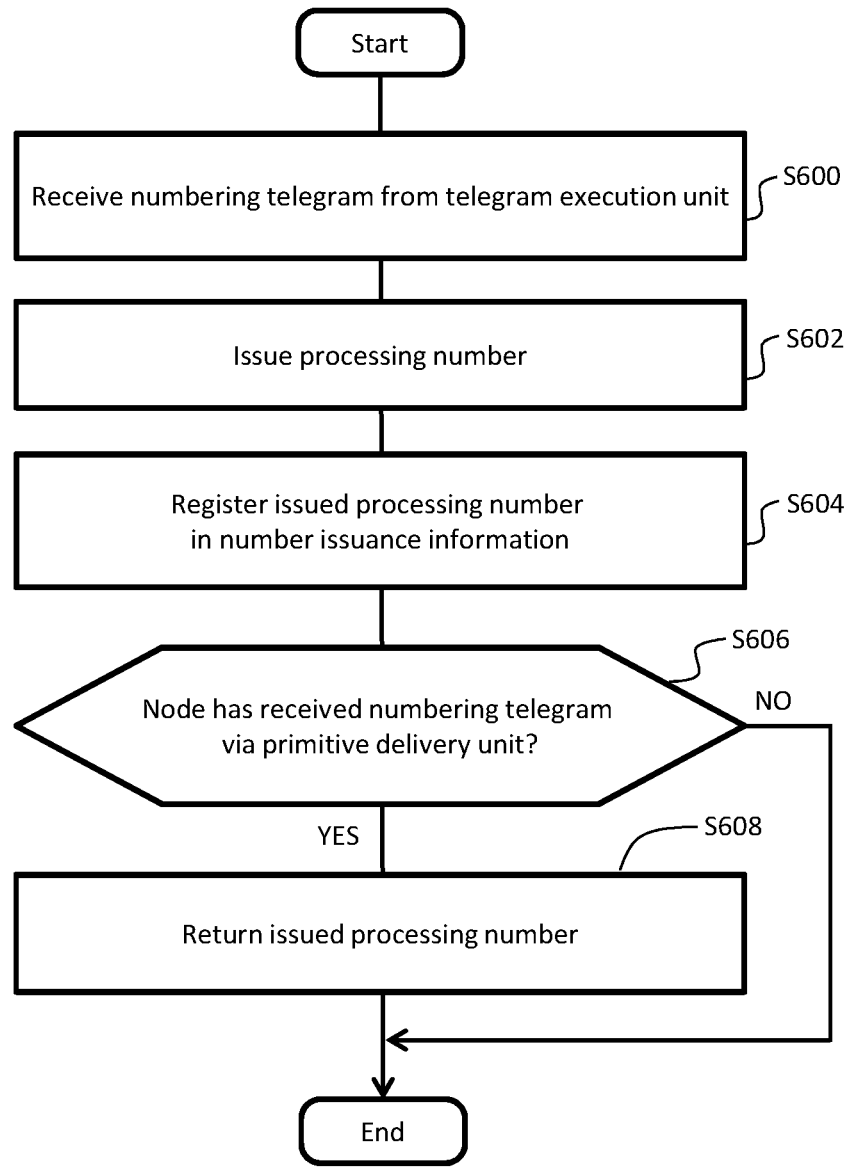
FIG. 13 is a flowchart illustrating a processing example of a number issuing unit of the configuration management process.

FIG. 13 is a flowchart illustrating a processing example of the number issuing unit 134 of the configuration management process 130.

(S600) When the number issuing unit 134 receives a numbering telegram from the telegram execution unit 133, the processing proceeds to S602.

(S602) The number issuing unit 134 issues a larger processing number than the processing number included in the number issuance information 400. After that, the processing proceeds to S604.

(S604) The number issuing unit 134 registers the processing number issued in S602 in the number issuance information 400. After that, the processing proceeds to S606.

(S606) The number issuing unit 134 determines whether the node 110 has received the numbering telegram via the primitive delivery unit 131. The processing proceeds to S608 when the determination result is "YES" and this process ends when the determination result is "NO".

(S608) The number issuing unit 134 returns the processing number issued in S602 to a transmission source (for example, the rebalancing apparatus 20) of the numbering telegram. After that, this process ends.

Figure 14:
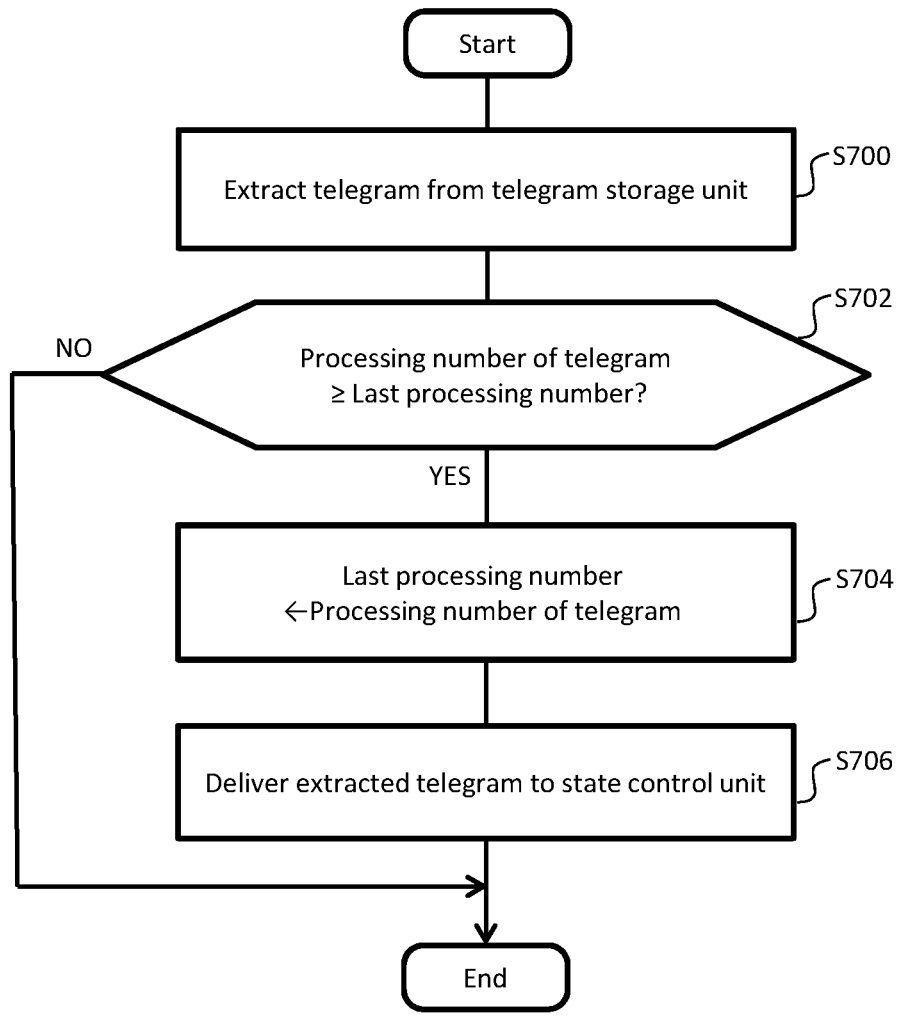
FIG. 14 is a flowchart illustrating a processing example of a processing number control unit of a range process.

FIG. 14 is a flowchart illustrating a processing example of the processing number control unit 174 of the range process 170.

(S700) The processing number control unit 174 extracts a telegram from the telegram storage unit 172. After that, the processing proceeds to S702.

(S702) The processing number control unit 174 determines whether the processing number of the telegram extracted in S700 is equal to or larger than the last processing number registered in the process control information 700. The processing number control unit 174 advances the processing to S704 when the determination result is "YES" and this process ends when the determination result is "NO".

(S704) The processing number control unit 174 updates the last processing number with the processing number in the acquired telegram. After that, the processing proceeds to S706.

(S706) The processing number control unit 174 delivers the telegram extracted in S700 to the state control unit 176 and this process ends.

Figure 15:
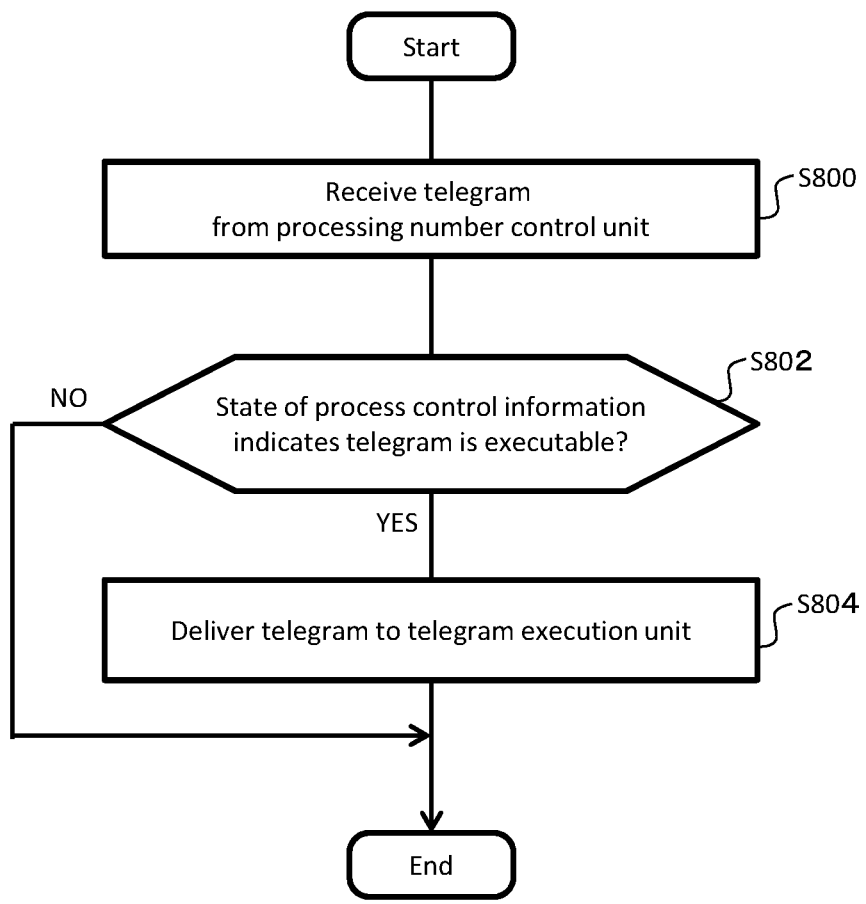
FIG. 15 is a flowchart illustrating a processing example of a state control unit of the range process.

FIG. 15 is a flowchart illustrating a processing example of the state control unit 176 of the range process 170.

(S800) When the state control unit 176 receives the telegram from the processing number control unit 174, the processing proceeds to S802.

(S802) The state control unit 176 determines whether the telegram received in S800 can be executed in the current state of the process control information 700 by referring to the state transition information 800. The state control unit 176 advances processing to S804 when the determination result is "YES" and this process ends when the determination result is "NO".

(S804) The state control unit 176 delivers the telegram received in S800 to the telegram execution unit 173 and this process ends.

Figure 16:
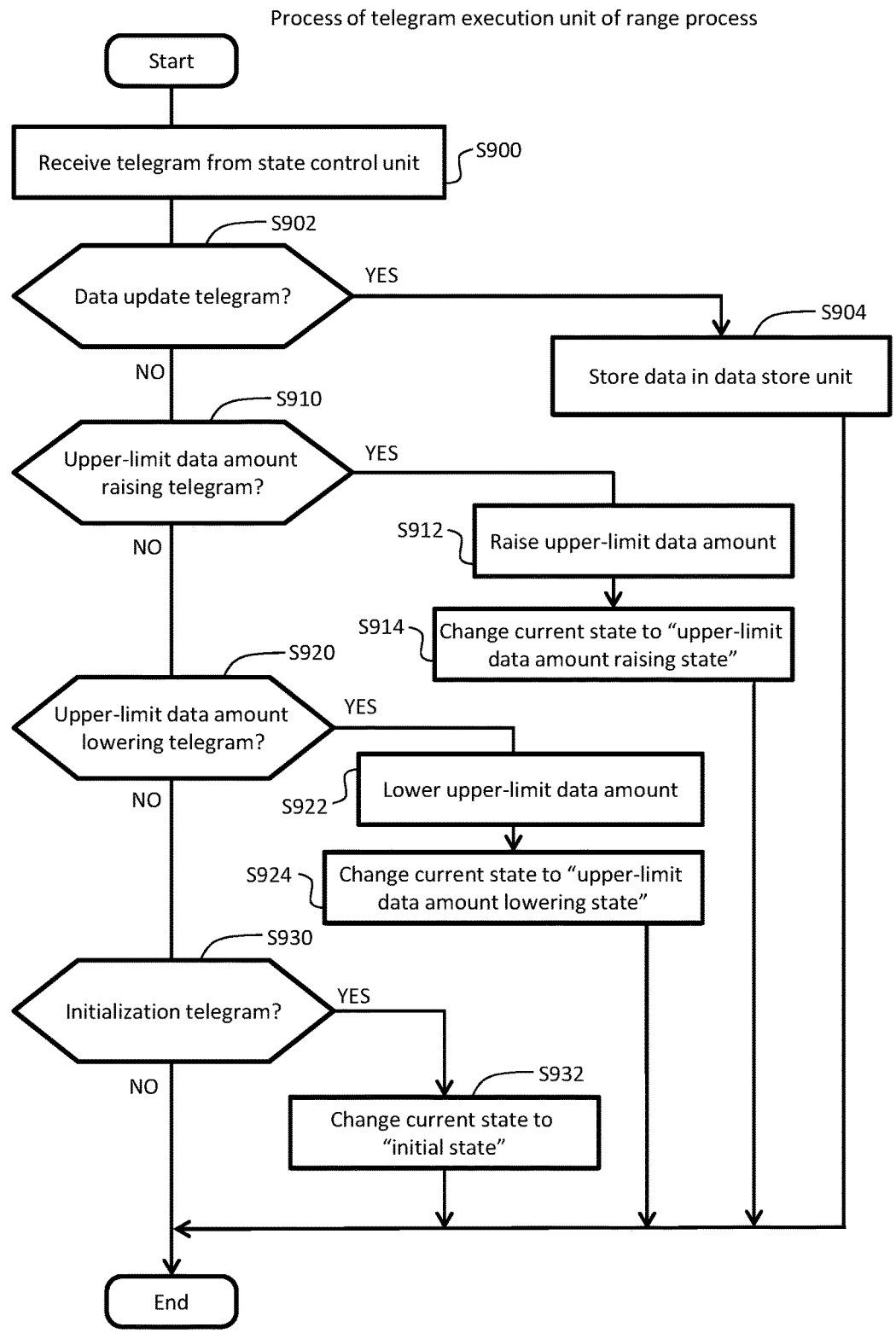
FIG. 16 is a flowchart illustrating a processing example of the telegram execution unit of the range process.

FIG. 16 is a flowchart illustrating a processing example of the telegram execution unit 173 of the range process 170.

(S900) When the telegram execution unit 173 receives a telegram from the state control unit 176, the processing proceeds to S902.

(S902) The telegram execution unit 173 determines whether the telegram is a data update telegram. The processing proceeds to S904 when the determination result is "YES" and proceeds to S910 when the determination result is "NO".

(S910) The telegram execution unit 173 determines whether the telegram is an upper-limit data amount raising telegram. The processing proceeds to S912 when the determination result is "YES" and proceeds to S920 when the determination result is "NO".

(S920) The telegram execution unit 173 determines whether the telegram is an upper-limit data amount lowering telegram. The processing proceeds to S922 when the determination result is "YES" and proceeds to S930 when the determination result is "NO".

(S930) The telegram execution unit 173 determines whether the telegram is an initialization telegram. The processing proceeds to S932 when the determination result is "YES" and this process ends when the determination result is "NO".

<Case of Data Update Telegram>

(S904) The telegram execution unit 173 stores data in the data store unit 177 and this process ends.

<Case of Upper-Limit Data Amount Raising Telegram>

(S912) The telegram execution unit 173 raises the upper-limit data amount of the resource information 500. For example, the upper-limit data amount of the resource information 500 is changed to a value designated in the upper-limit data amount raising telegram. After that, the processing proceeds to S914.

(S914) The telegram execution unit 173 changes the current state of the process control information 700 to an "upper-limit data amount raising state" and this process ends.

<Case of Upper-Limit Data Amount Lowering Telegram>

(S922) The telegram execution unit 173 lowers the upper-limit data amount of the resource information 500. For example, the upper-limit data amount of the resource information 500 is changed to a value designated in the upper-limit data amount lowering telegram. After that, the processing proceeds to S924.

(S924) The telegram execution unit 173 changes the current state of the process control information 700 to an "upper-limit data amount lowering state" and this process ends.

<Case of Initialization Telegram>

(S932) The telegram execution unit 173 changes the process control information 700 to an "initial state" and this process ends.

Figure 17:
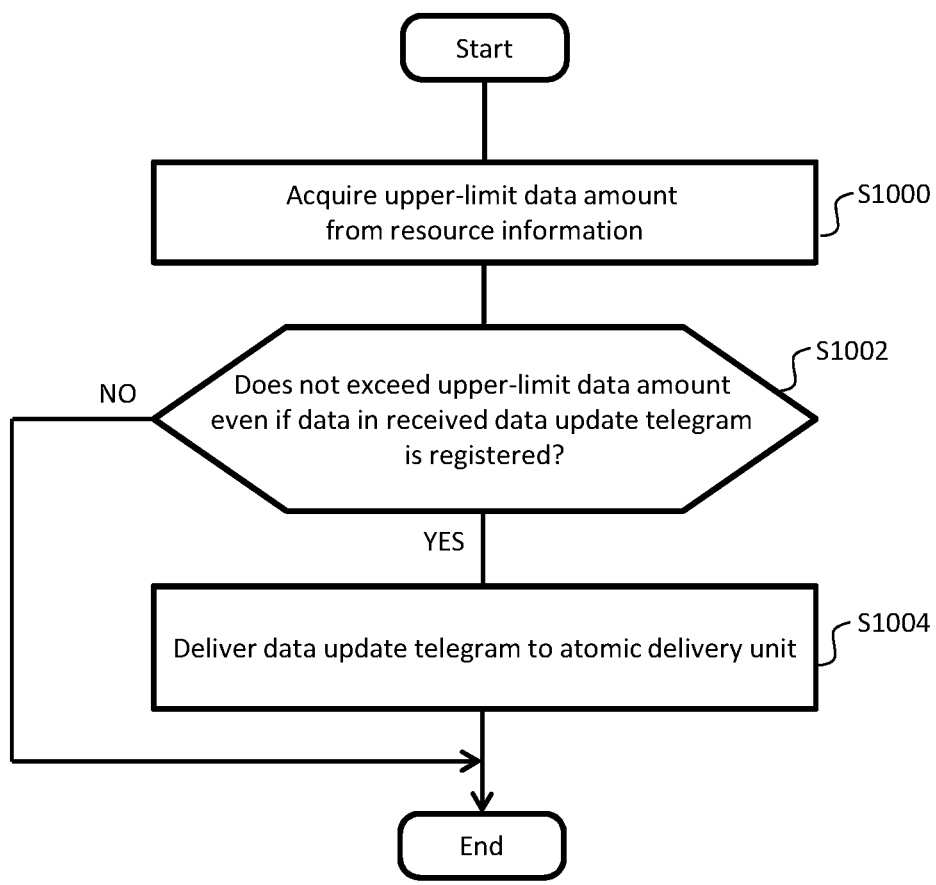
FIG. 17 is a flowchart illustrating a processing example of a resource checking unit of the range process.

FIG. 17 is a flowchart illustrating a processing example of the resource checking unit 175 of the range process 170.

(S1000) The resource checking unit 175 acquires the upper-limit data amount from the resource information 500.

(S1002) The resource checking unit 175 determines whether the upper-limit data amount acquired in S1000 is exceeded even if the data in the received data update telegram is registered in the range. The resource checking unit 175 advances processing to S1004 when the determination result is "YES" and this process ends when the determination result is "NO".

(S1004) The resource checking unit 175 delivers the data update telegram to the primitive delivery unit 171 and this process ends.

Next, specific examples of the rebalancing process, the scale-out process, and the scale-in process will be described.

FIGS. 18A to 18I are diagrams for describing an example of the rebalancing process according to the present embodiment.

(FIG. 18A) In a configuration in which the node A manages the ranges 1 and 4, the node B manages the ranges 1 and 2, the node C manages the ranges 2 and 3, and the node D manages the ranges 3 and 4, a rebalancing process of moving a portion of the data in the range 3 to the range 2 is performed. It is assumed that the maximum memory volume of each node is "200" and a monitoring upper-limit (corresponding to the upper-limit data amount) of each range is "100".

(FIG. 18B) In the process of S204, a blank temporary range 3.5 is created in the nodes C and D that manage the source range 3. Here, it is assumed that the monitoring upper limit of the blank temporary range 3.5 is "38".

(FIG. 18C) In the process of S206, an upper-limit data amount lowering telegram (a telegram for changing a monitoring upper limit to "62") for the source range 3 and the destination range 2 is transmitted and the monitoring upper limits of the source range 3 and the destination range 2 are changed to "62". The monitoring upper limit value may be determined so that the sum of the monitoring upper limits of all ranges managed by the node does not exceed the maximum memory volume "200" of the node.

(FIG. 18D) In the process of S208, a portion of the data in the source range 3 is moved to the temporary range 3.5.

Figure 18A:
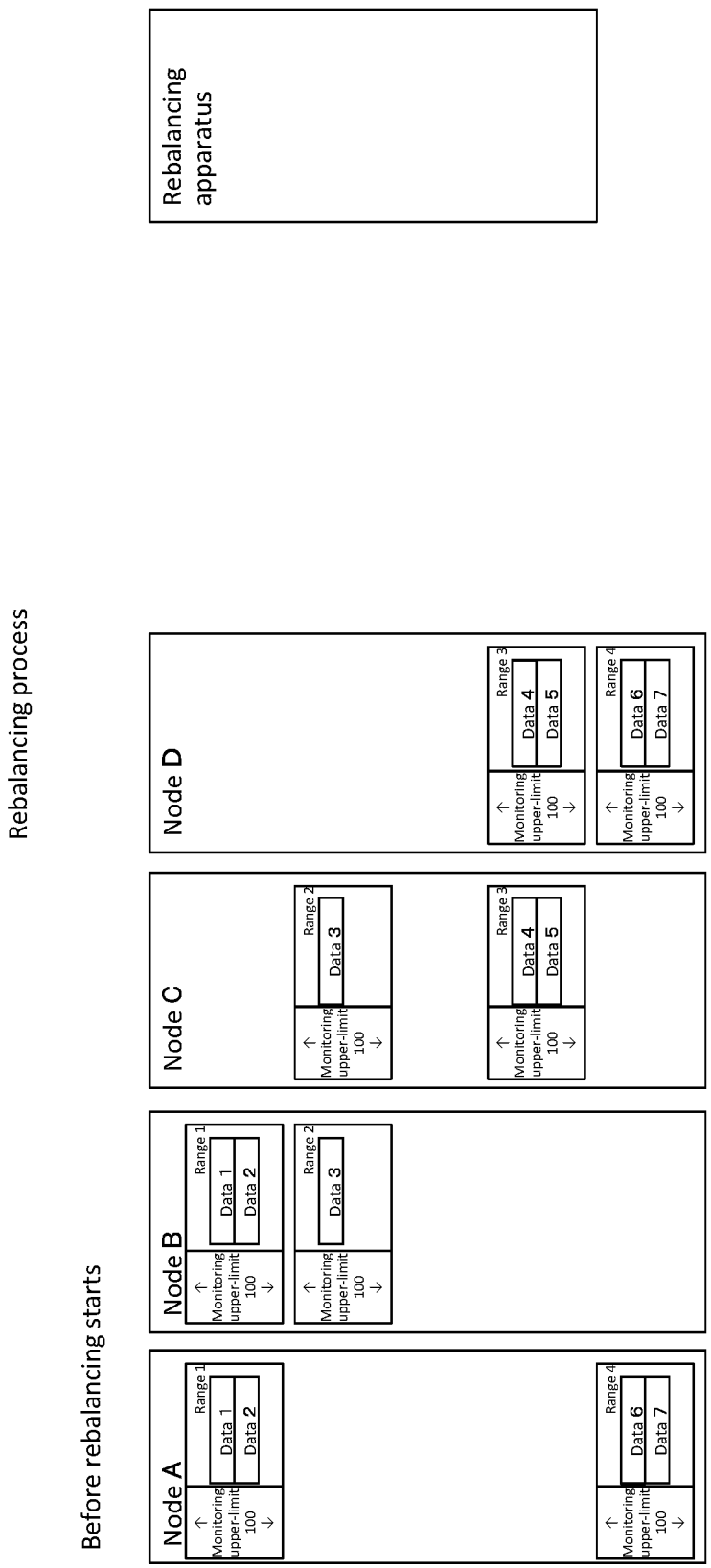
FIG. 18A is a diagram for describing an example of the rebalancing process.
Figure 18B:
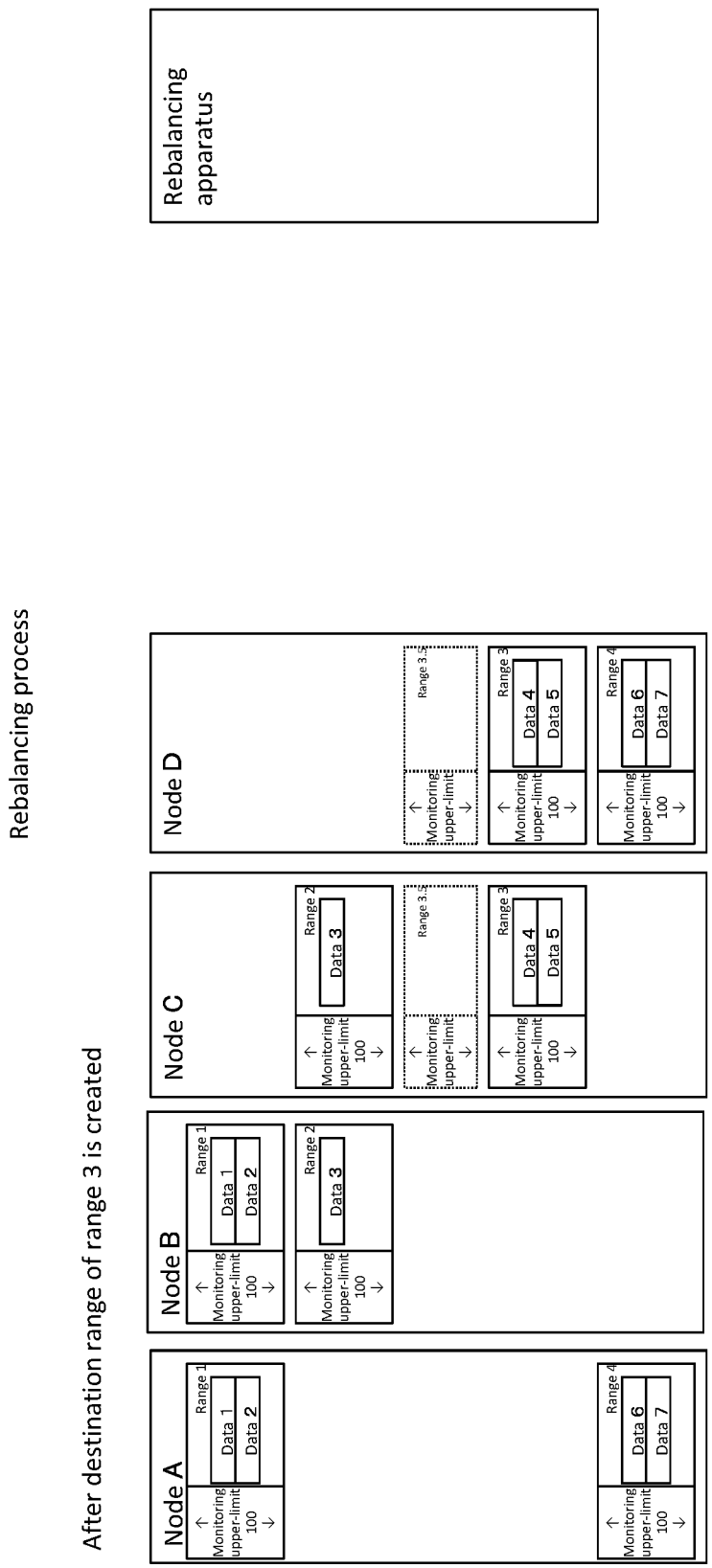
FIG. 18B is a diagram for describing an example of the rebalancing process.
Figure 18C:
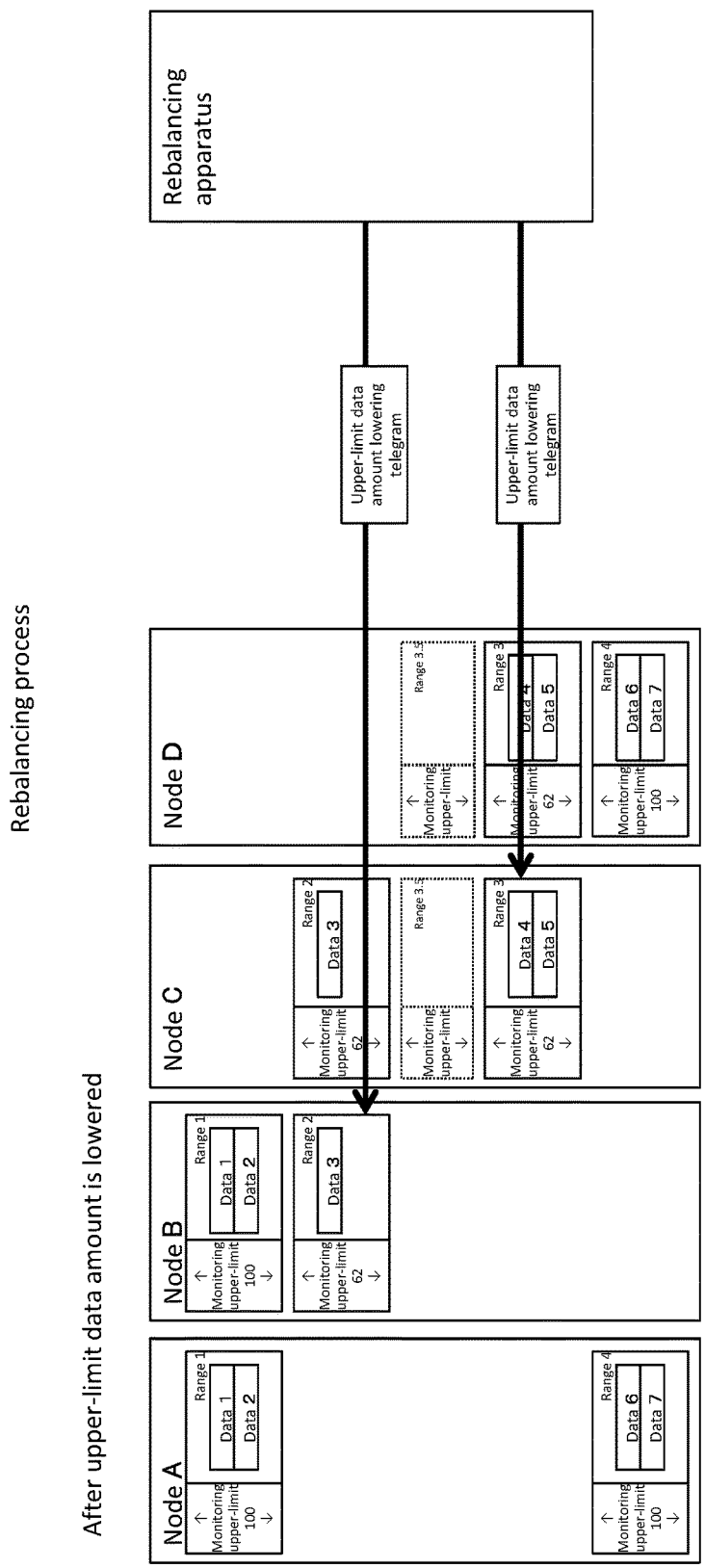
FIG. 18C is a diagram for describing an example of the rebalancing process.
Figure 18D:
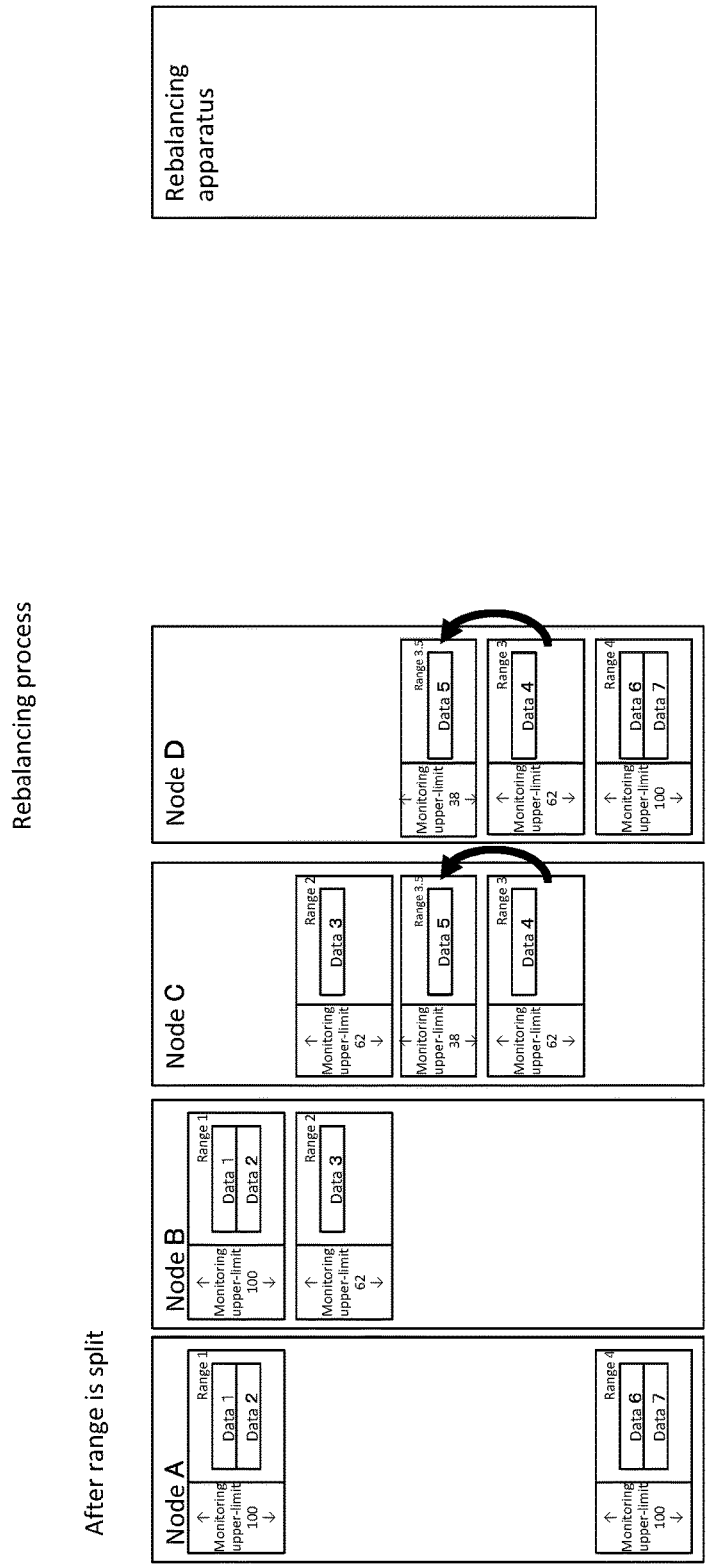
FIG. 18D is a diagram for describing an example of the rebalancing process.
Figure 18E:
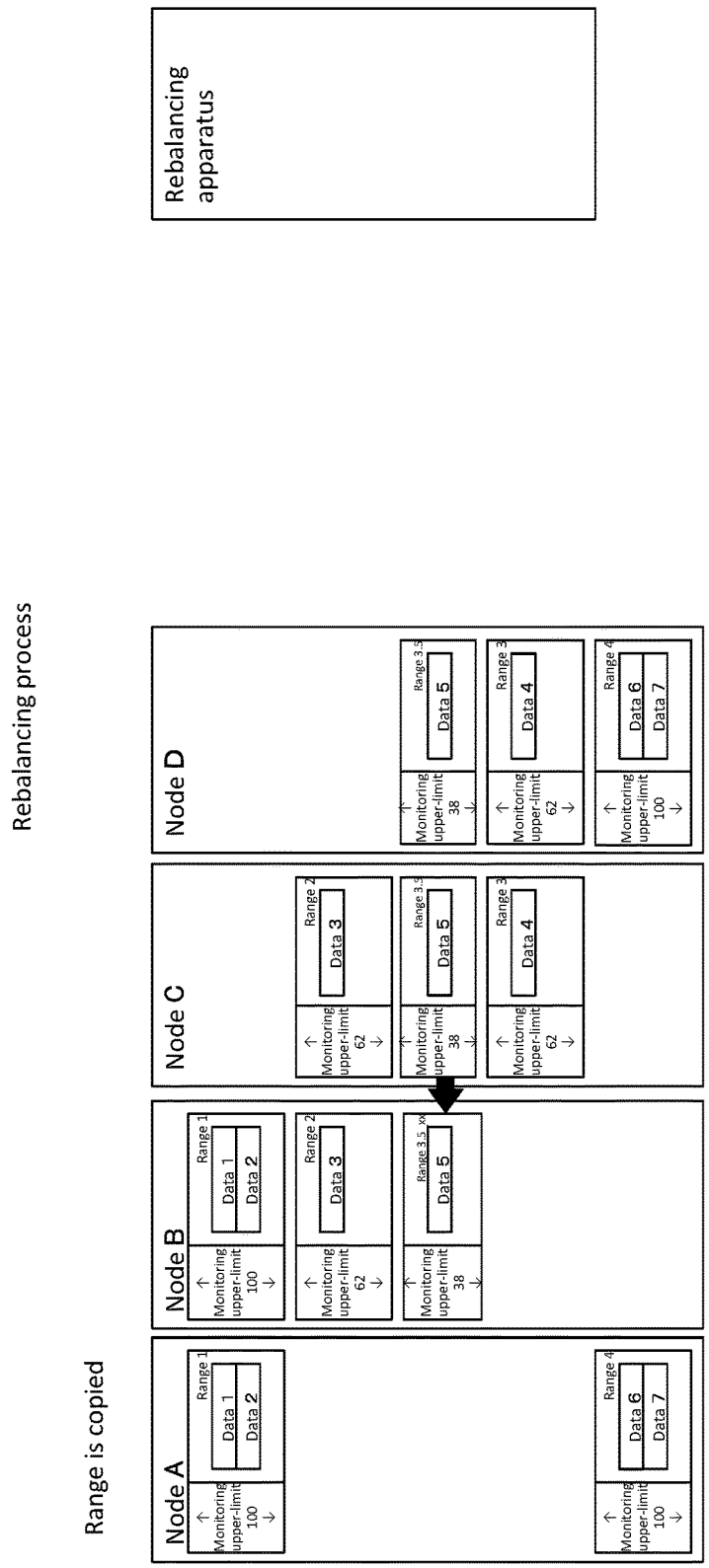
FIG. 18E is a diagram for describing an example of the rebalancing process.
Figure 18F:
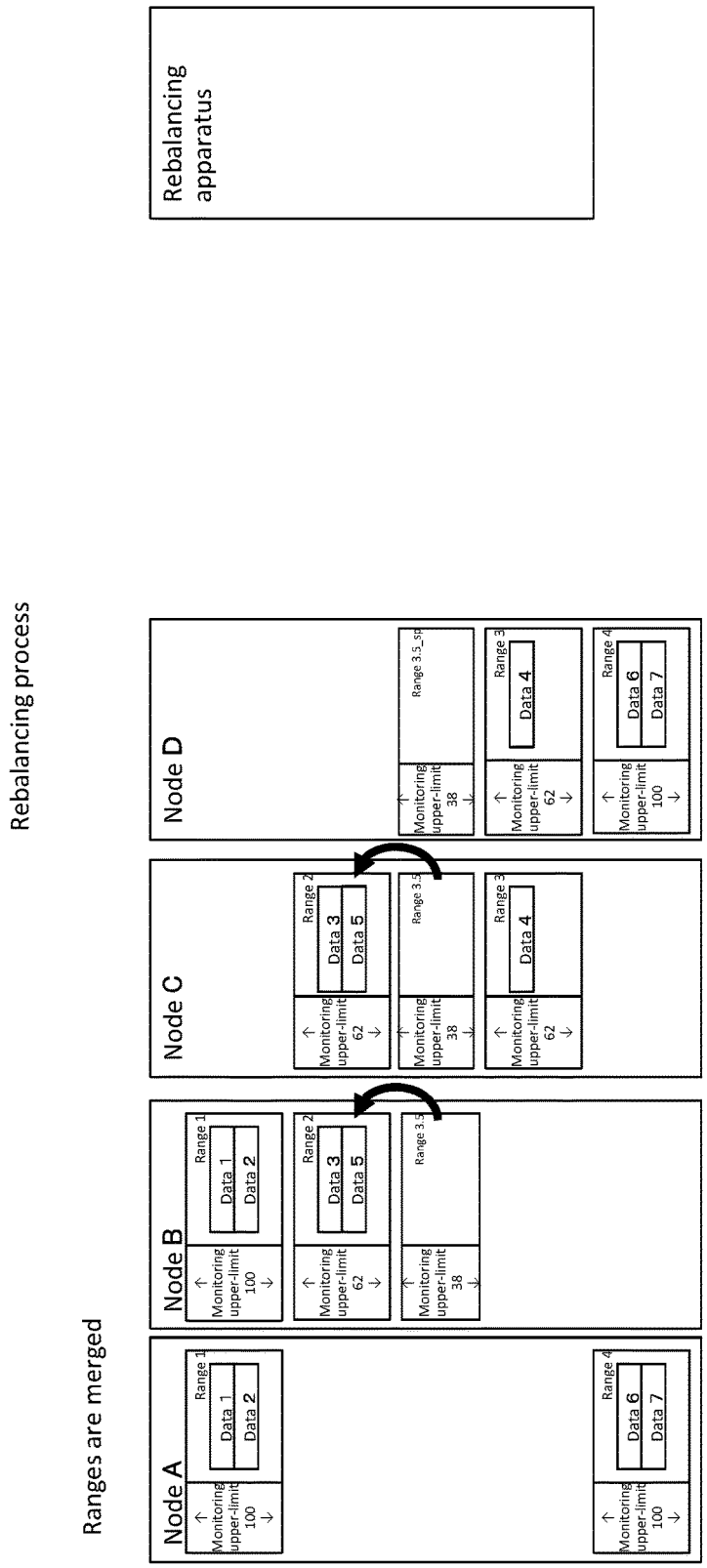
FIG. 18F is a diagram for describing an example of the rebalancing process.
Figure 18G:
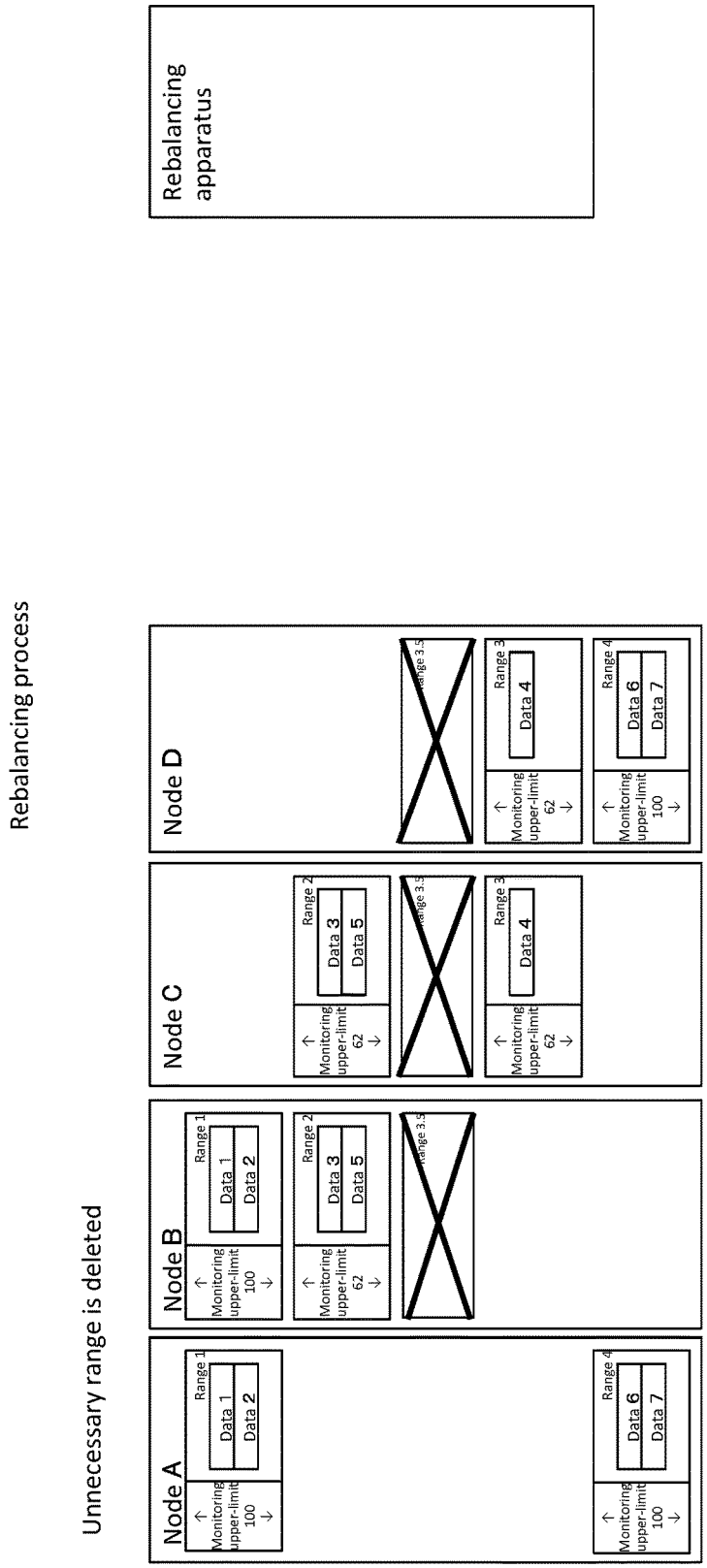
FIG. 18G is a diagram for describing an example of the rebalancing process.
Figure 18H:
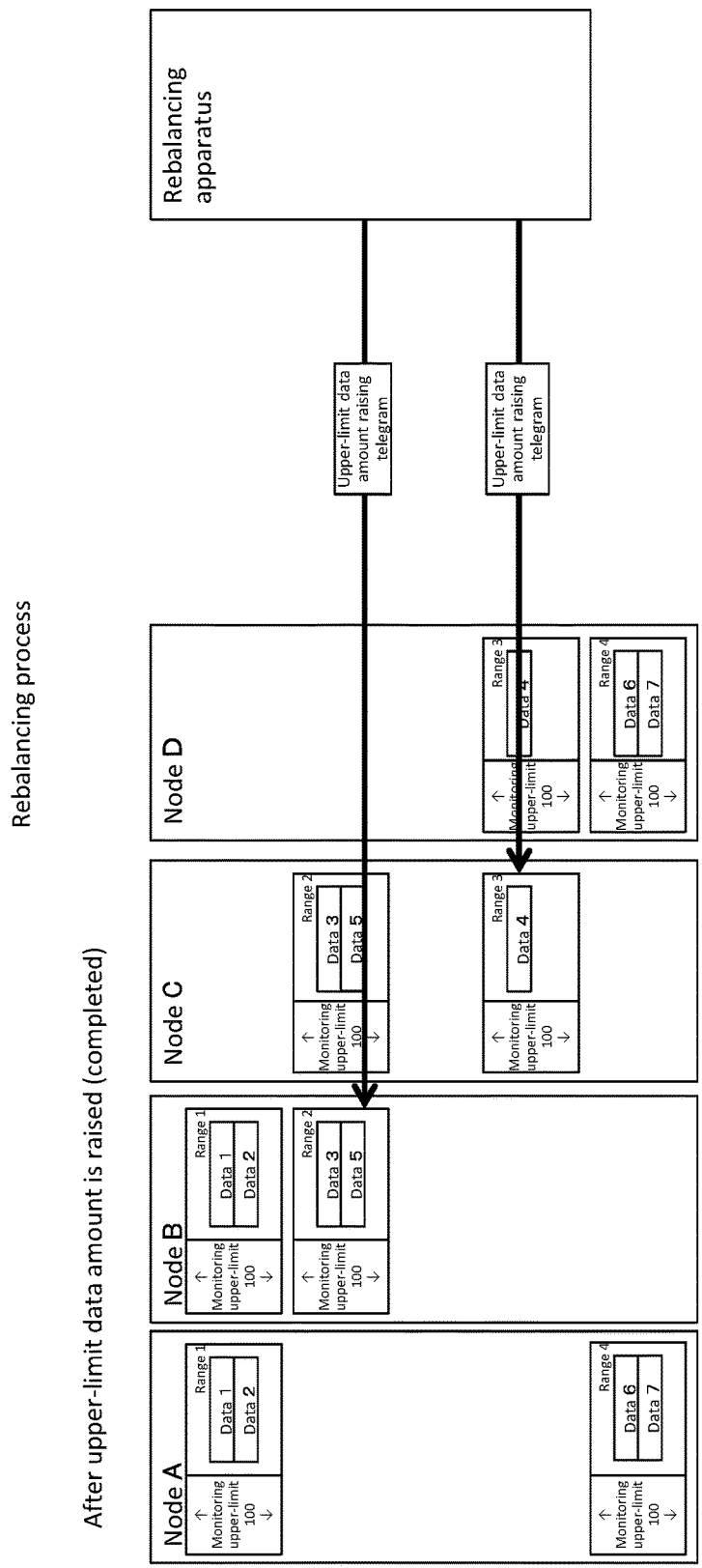
FIG. 18H is a diagram for describing an example of the rebalancing process.
Figure 18I:
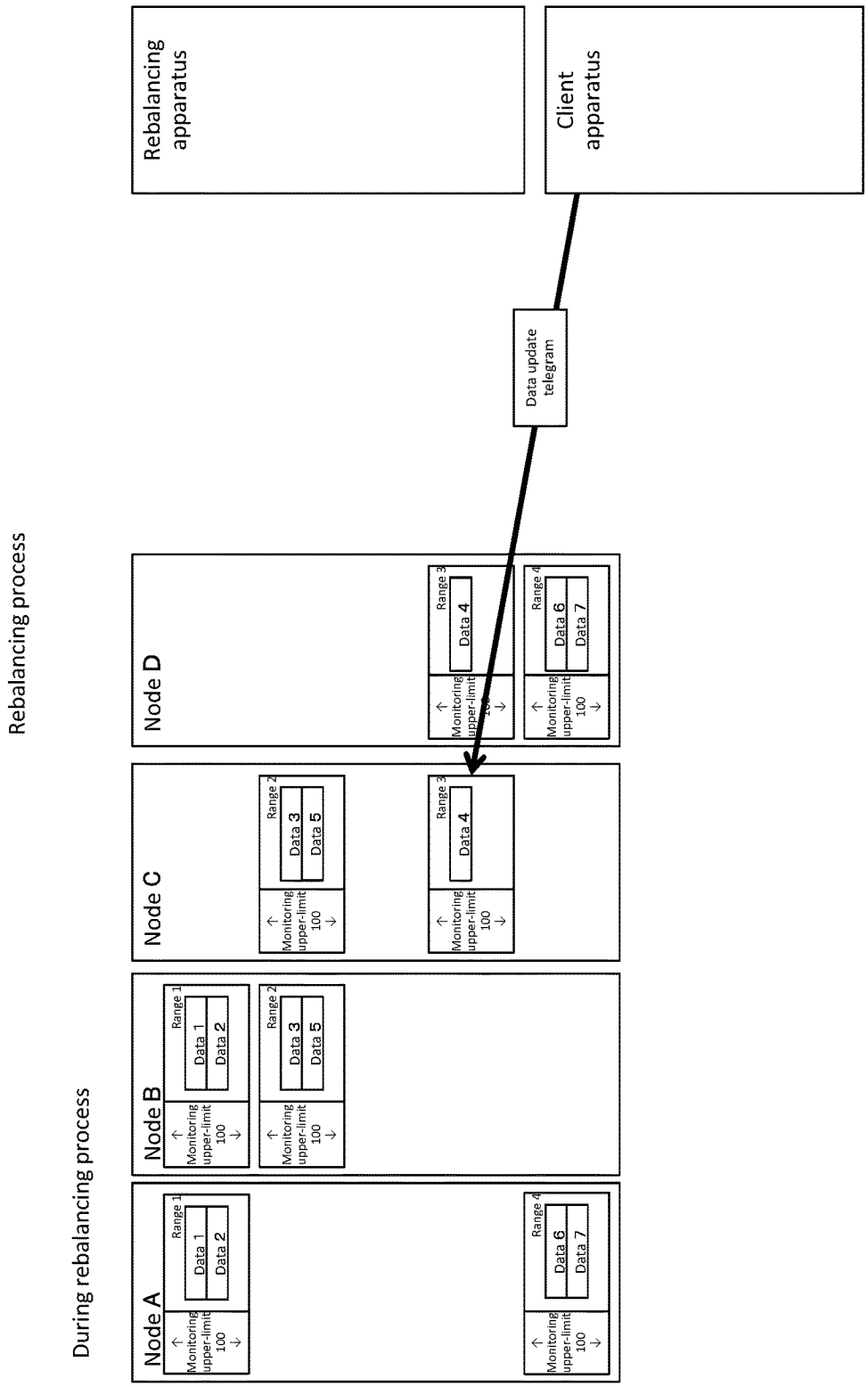
FIG. 18I is a diagram for describing an example of the rebalancing process.

(FIG. 18E) In the process of S210, the temporary range 3.5 is copied to the node B that manages the destination range 2. In this case, although the ranges 1, 2, and 3.5 are present in the node B, since the monitoring upper limit of the range 2 in FIG. 18C is lowered to "62", the sum of the monitoring upper limits of these ranges does not exceed the maximum memory volume "200" of the node B. That is, resource overflow is prevented.

(FIG. 18F) In the process of S212, the range 3.5 is merged with the range 2.

(FIG. 18G) In the process of S214, the unnecessary range 3.5 is deleted.

(FIG. 18H) In the process of S216, an upper-limit data amount raising telegram (a telegram for changing the monitoring upper limit to "100") for the source range 3 and the destination range 2 is transmitted and the monitoring upper limits of the source range 3 and the destination range 2 are changed to "100". In this way, the monitoring upper limits of the ranges 2 and 3 which were lowered in FIG. 18C are restored.

(FIG. 18I) During these rebalancing processes, the client apparatus 40, for example, may transmit a data update telegram with respect to each range. The same is applied to the scale-out and scale-in processes.

FIGS. 19A to 19H are diagrams for describing an example of the scale-out process according to the present embodiment.

(FIG. 19A) In a configuration in which the node A manages the ranges 1 and 4, the node C manages the ranges 1 and 3, and the node D manages the ranges 3 and 4, a scale-out process of adding the node B to the computer cluster is performed. It is assumed that the maximum memory volume of each node is "200" and a monitoring upper-limit of each range is "100".

(FIG. 19B) In the process of S300, the node B is added to the computer cluster.

(FIG. 19C) In the process of S306, a blank destination range 3.5 is created in the node C and the range 4 that manage the source range 3. Here, it is assumed that the monitoring upper limit of the destination range 3.5 is "38".

(FIG. 19D) In the process of S308, the upper-limit data amount lowering telegram for the source range 3 is transmitted and the monitoring upper limit of the destination range 3 is changed to "62".

(FIG. 19E) In the process of S310, a portion of the data in the source range 3 is moved to the destination range 3.5. In this case, although the ranges 1, 3, and 3.5 are present in the node C, since the monitoring upper limit of the range 3 is lowered to "62" in FIG. 19D, the sum of the monitoring upper limits of these ranges does not exceed the maximum memory volume "200" of the node C. The same is applied to the node D. That is, resource overflow is prevented.

(FIG. 19F) In the process of S312, the destination range 3.5 is copied to the added node B. Moreover, the range 1 of the node A may be copied to the added node B as necessary so that the amount of data is equalized as a whole.

(FIG. 19G) In the process of S314, the range 1 of the node C and the range 3.5 of the node D which become surplus (unnecessary) are deleted.

Figure 19A:
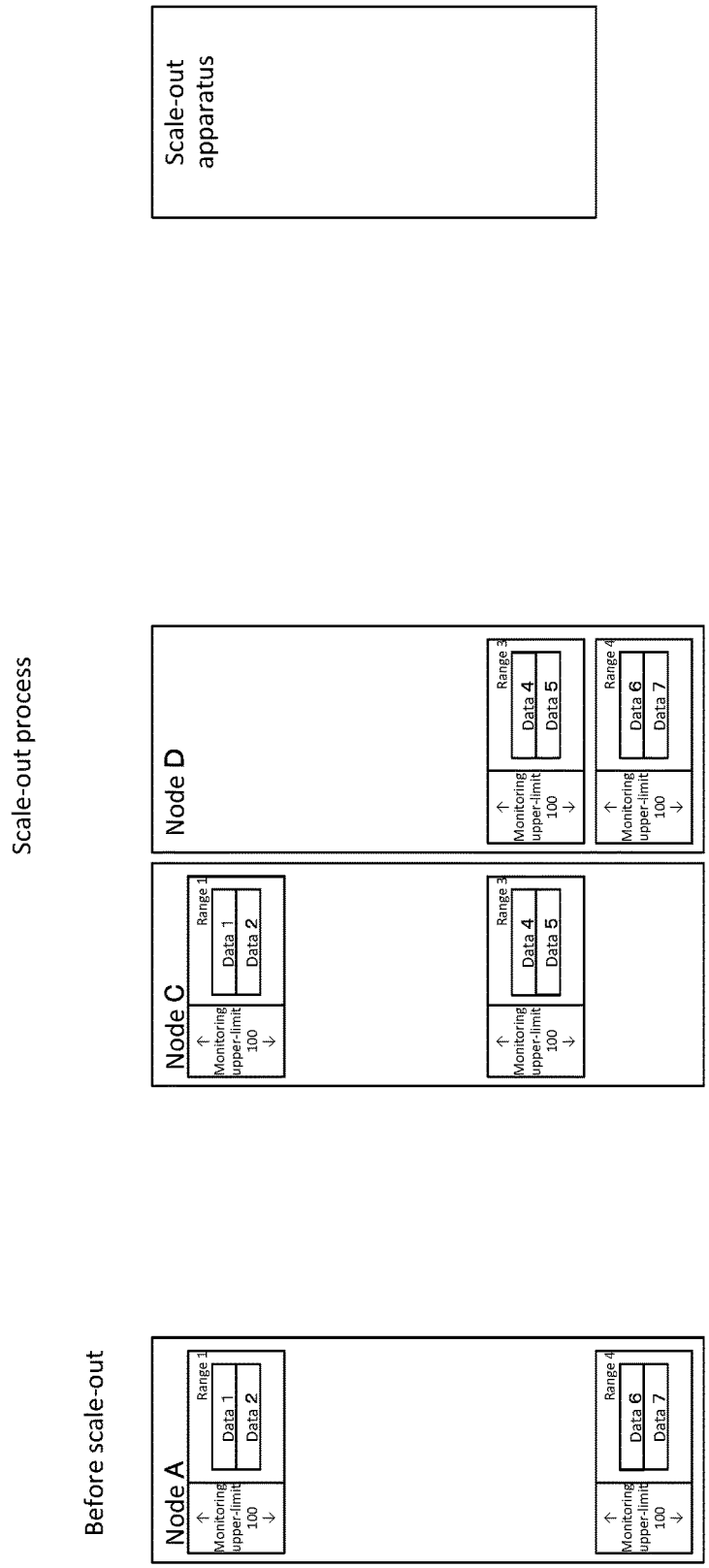
FIG. 19A is a diagram for describing an example of a scale-out process.
Figure 19B:
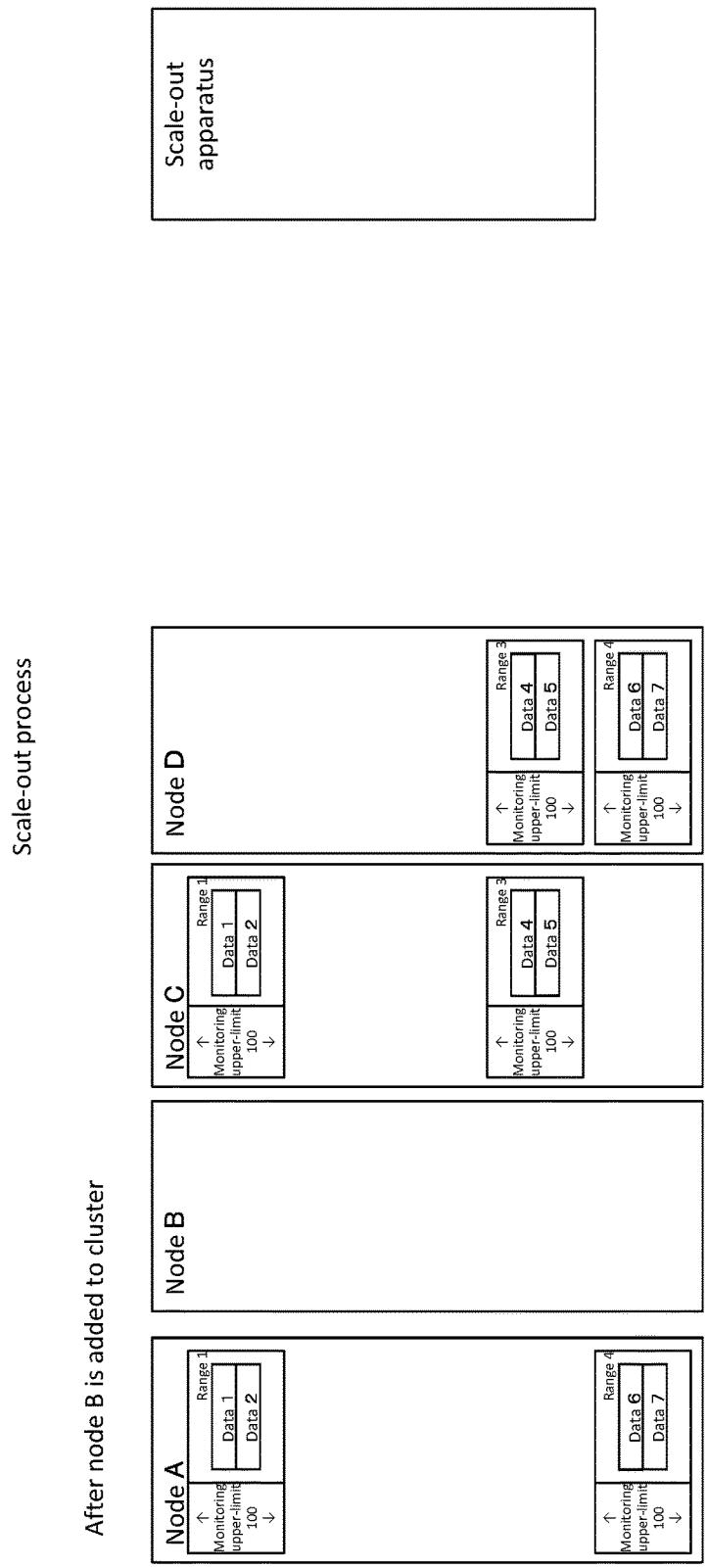
FIG. 19B is a diagram for describing an example of the scale-out process.
Figure 19C:
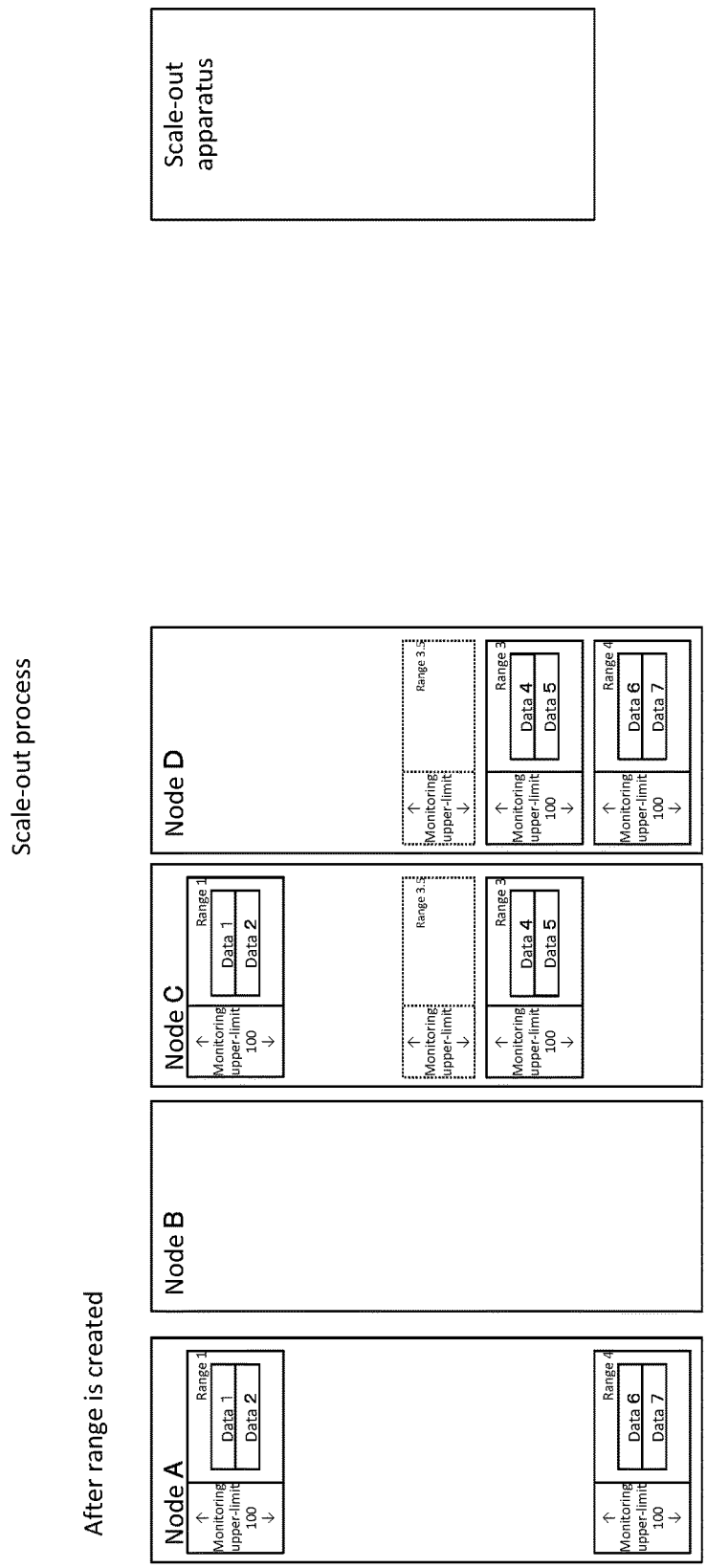
FIG. 19C is a diagram for describing an example of the scale-out process.
Figure 19D:
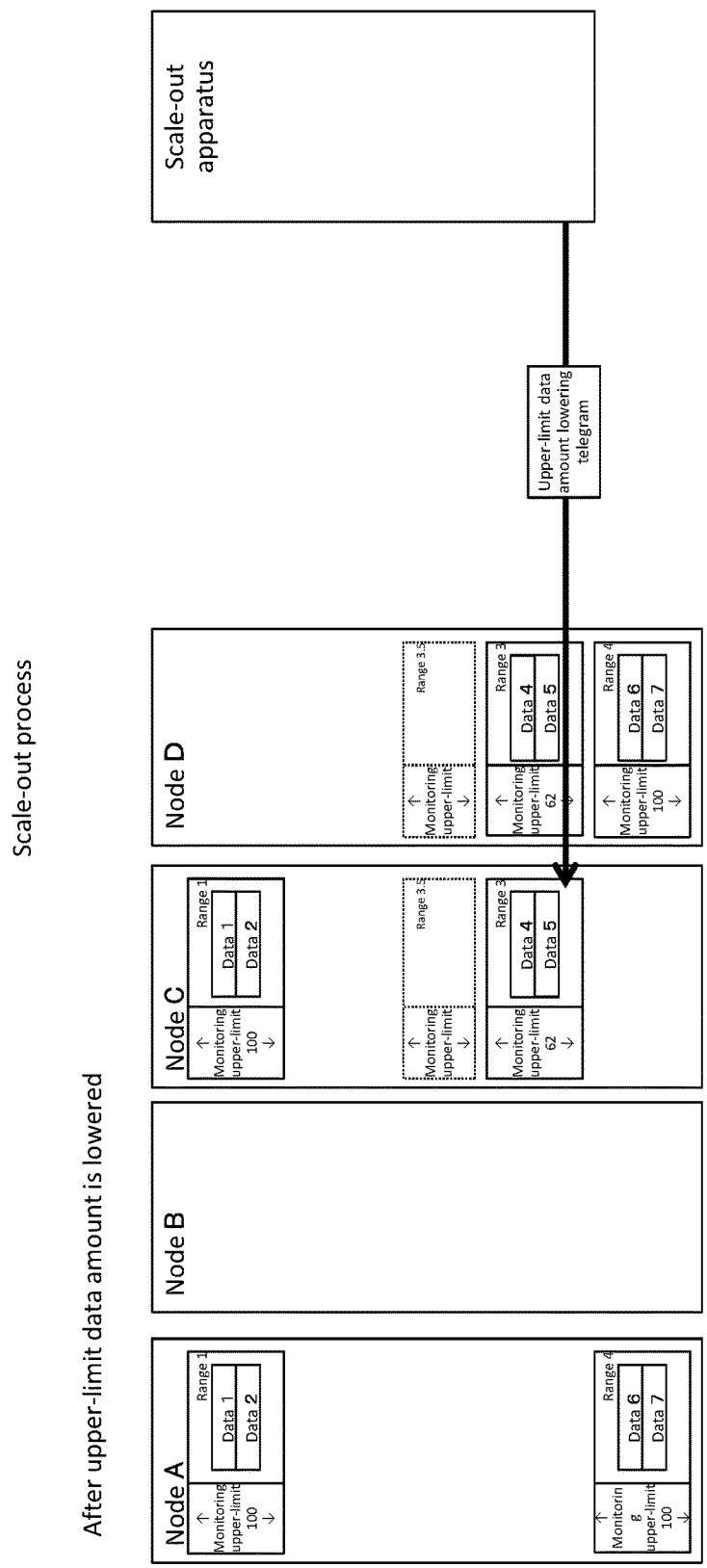
FIG. 19D is a diagram for describing an example of the scale-out process.
Figure 19E:
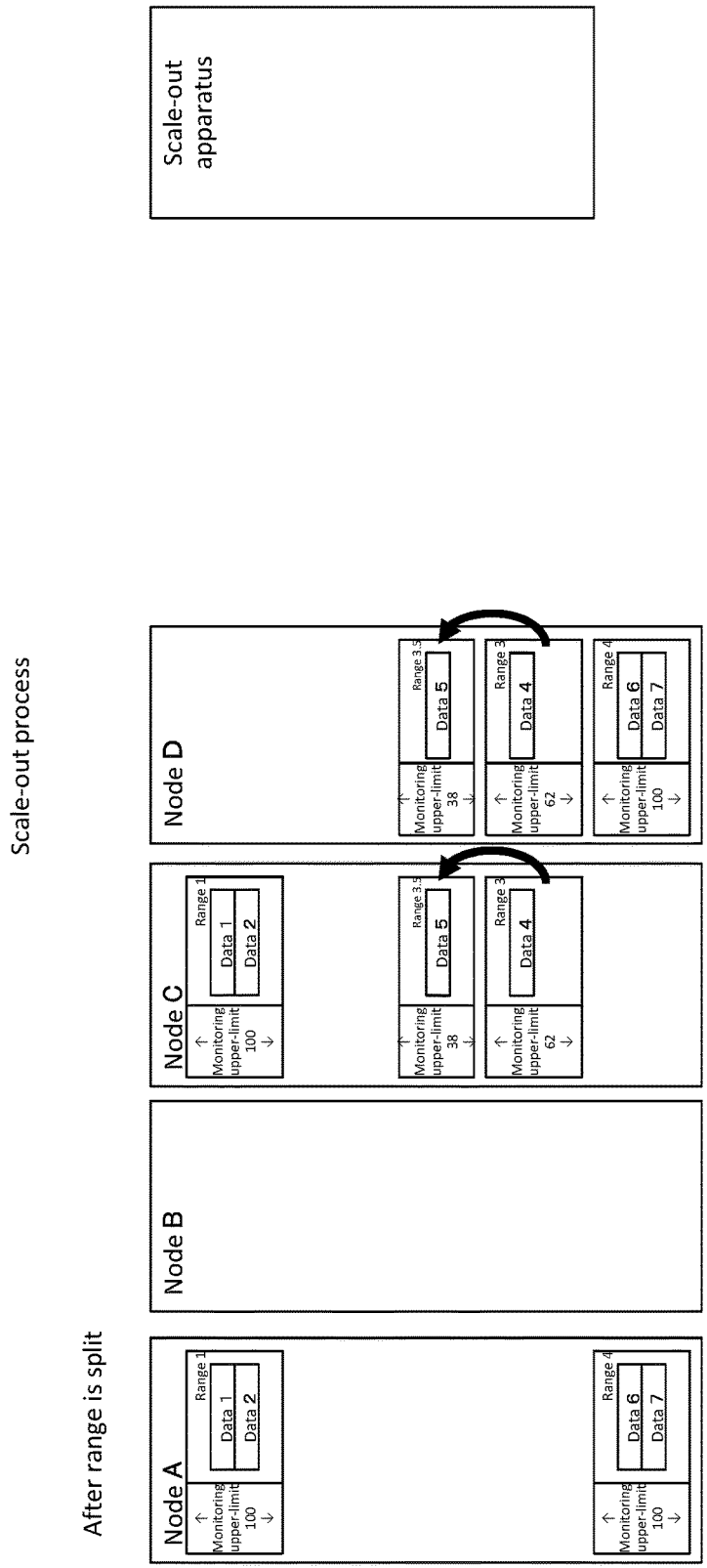
FIG. 19E is a diagram for describing an example of the scale-out process.
Figure 19F:
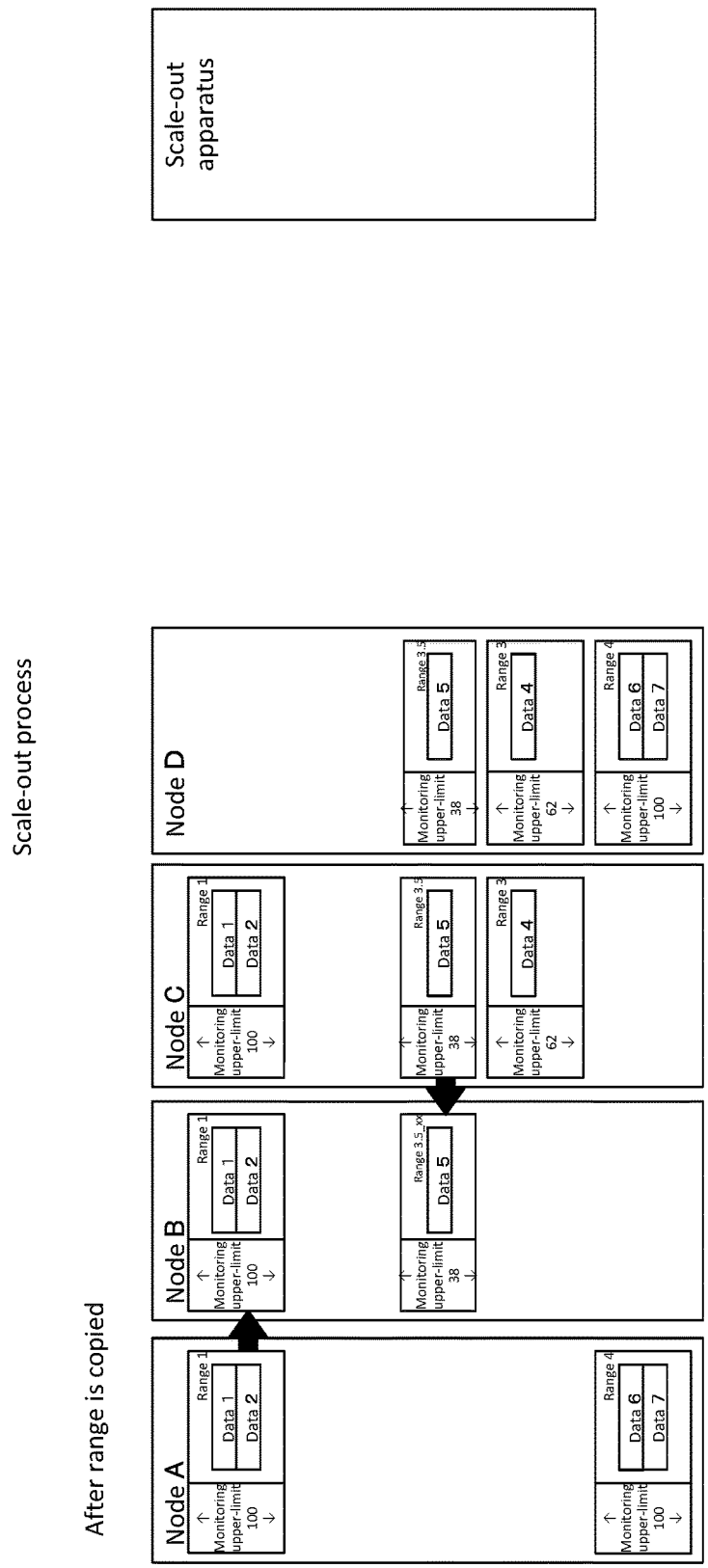
FIG. 19F is a diagram for describing an example of the scale-out process.
Figure 19G:
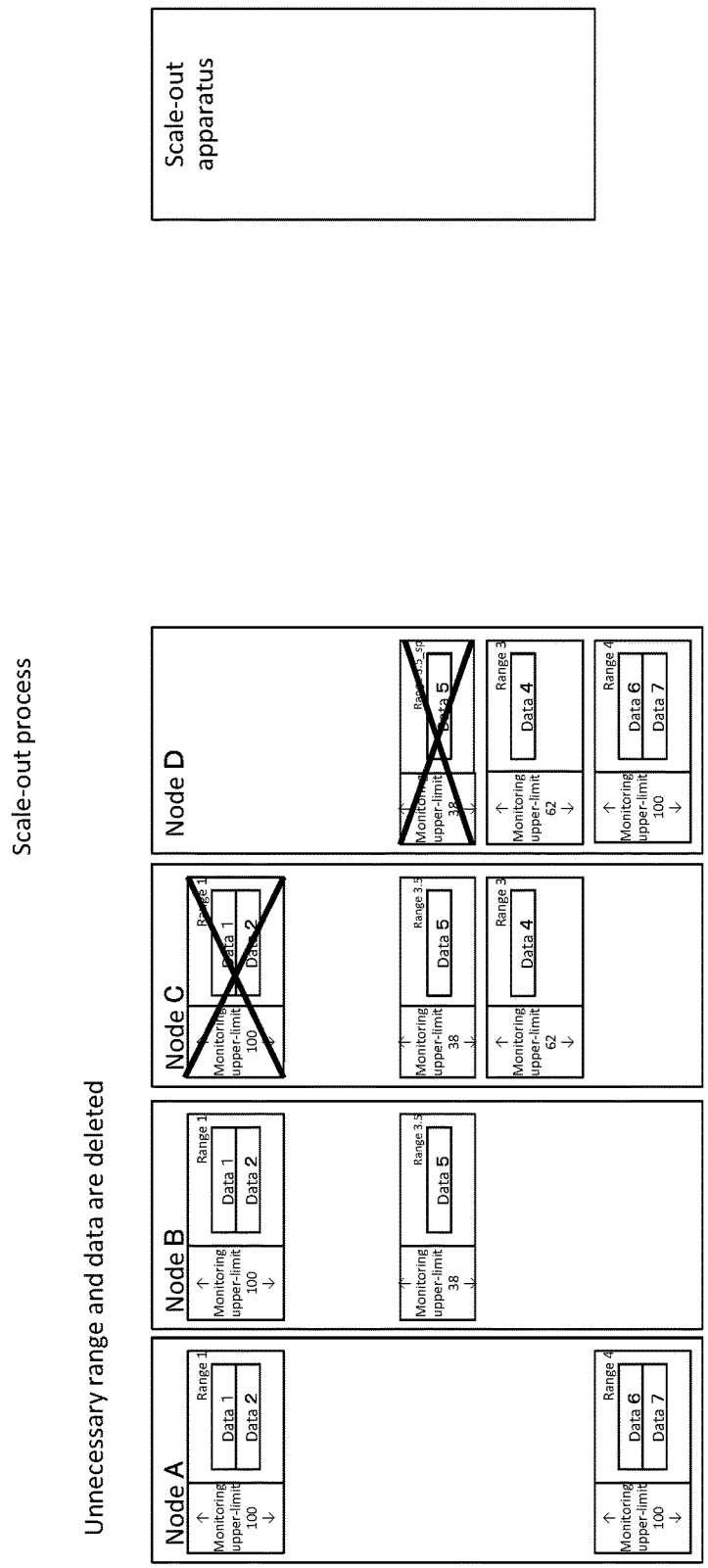
FIG. 19G is a diagram for describing an example of the scale-out process.
Figure 19H:
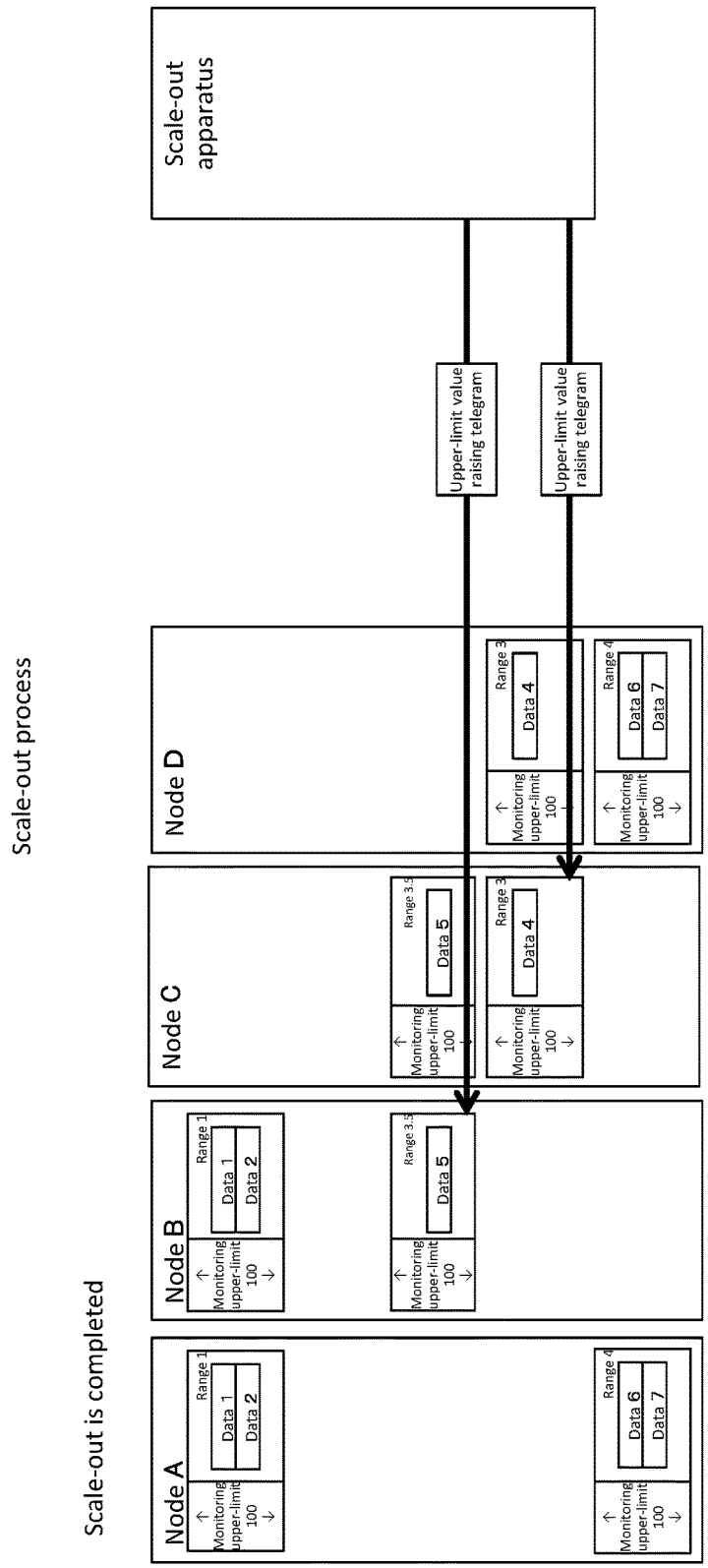
FIG. 19H is a diagram for describing an example of the scale-out process.

(FIG. 19H) In the process of S316, an upper-limit data amount raising telegram (a telegram for changing the monitoring upper limit to "100") for the source range 3 and the destination range 3.5 is transmitted and the monitoring upper limits of the source range 3 and the destination range 3.5 are changed to "100". In this way, the monitoring upper limit of the source range 3 which was lowered in FIG. 19E is restored. Moreover, the monitoring upper limit of the destination range 3.5 created in FIG. 19C is raised to "100".

FIGS. 20A to 20G are diagrams for describing an example of the scale-in process according to the present embodiment.

(FIG. 20A) In a configuration in which the node A manages the ranges 1 and 4, the node B manages the ranges 1 and 2, the node C manages the ranges 2 and 3, and the node D manages the ranges 3 and 4, a scale-in process of separating the node B from the computer cluster. The maximum memory volume of each node is "200" and the monitoring upper limit of each range is "100".

(FIG. 20B) In the process of S404, an upper-limit data amount lowering telegram (a telegram for changing the monitoring upper limit to "50") for the source range 2 and the destination range 3 is transmitted and the monitoring upper limits of the source range 2 and the destination range 3 are changed to "50".

Figure 20A:
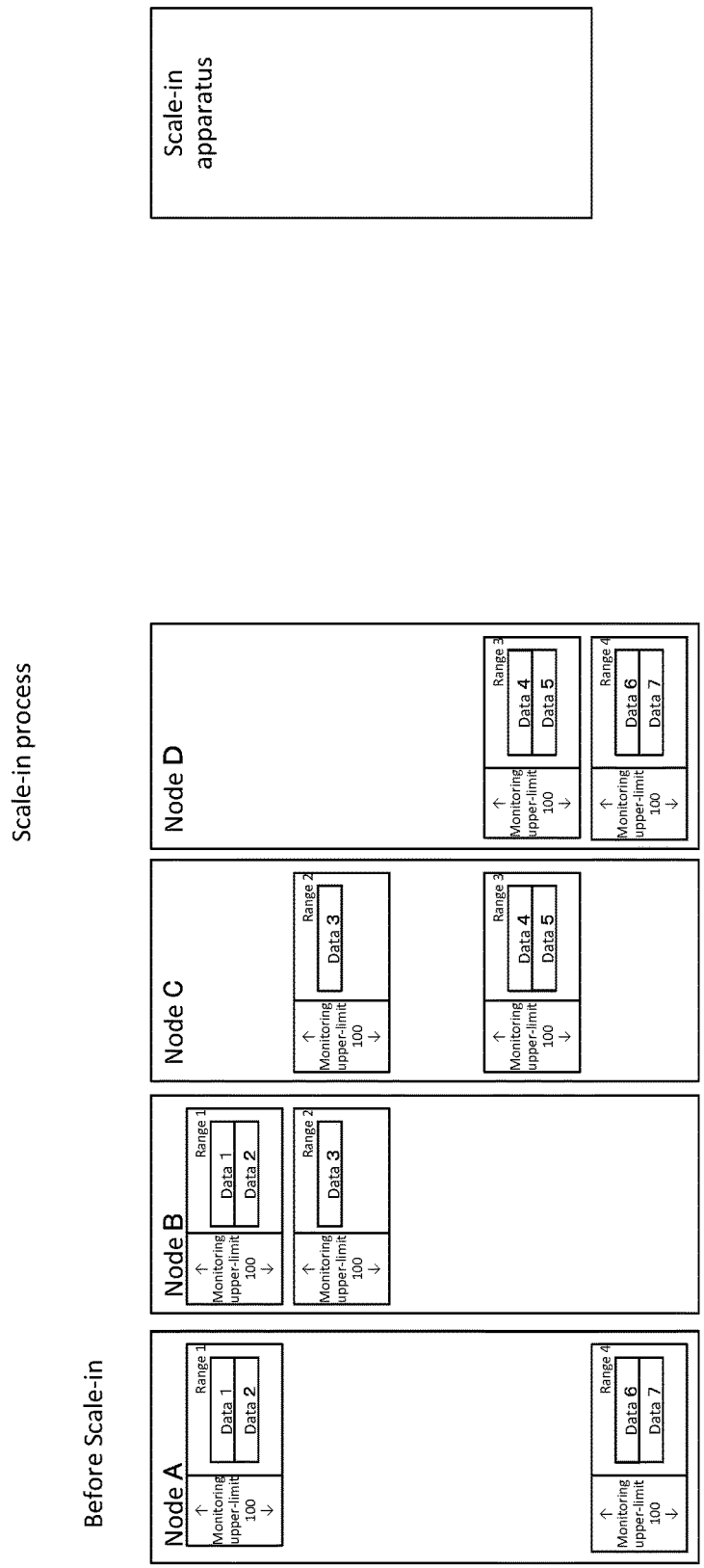
FIG. 20A is a diagram for describing an example of a scale-in process.
Figure 20B:
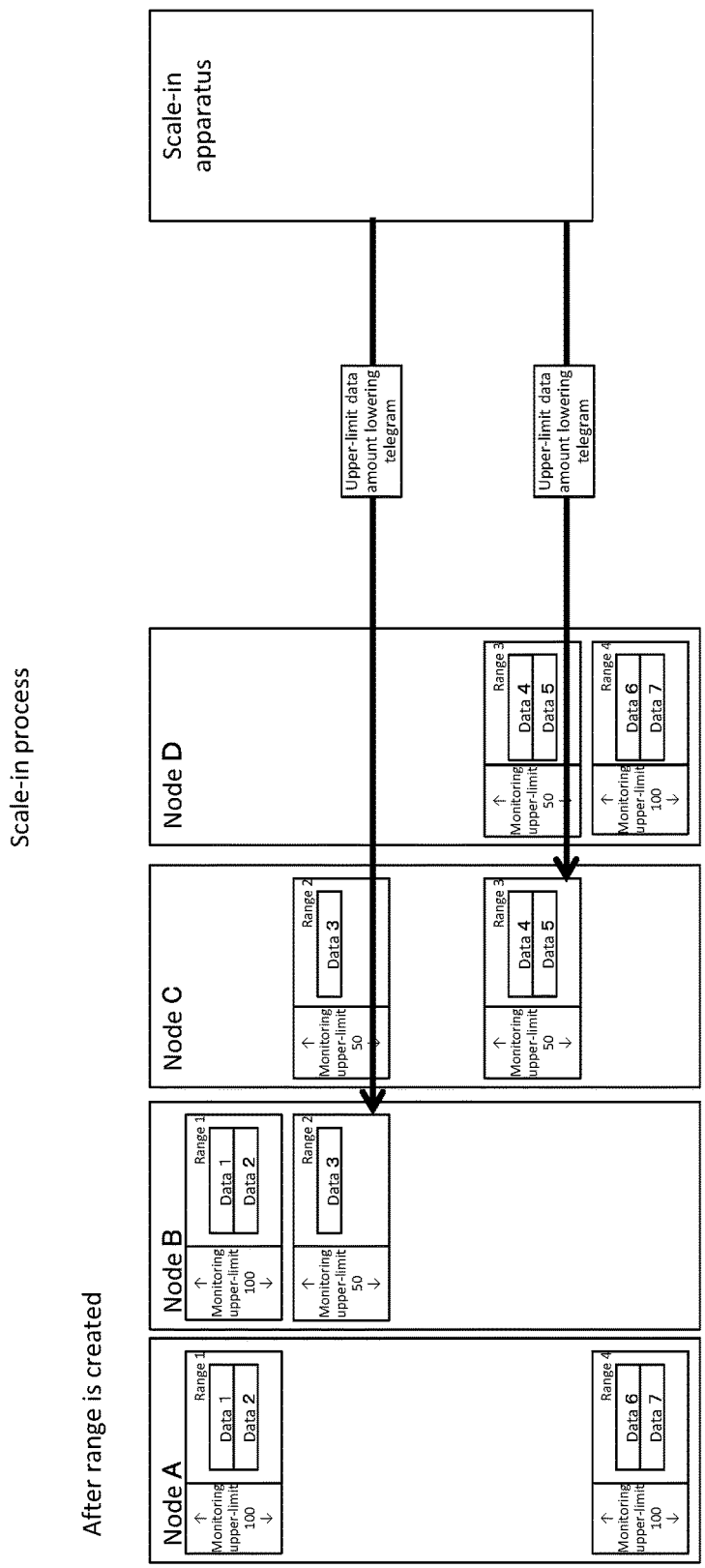
FIG. 20B is a diagram for describing an example of the scale-in process.
Figure 20C:
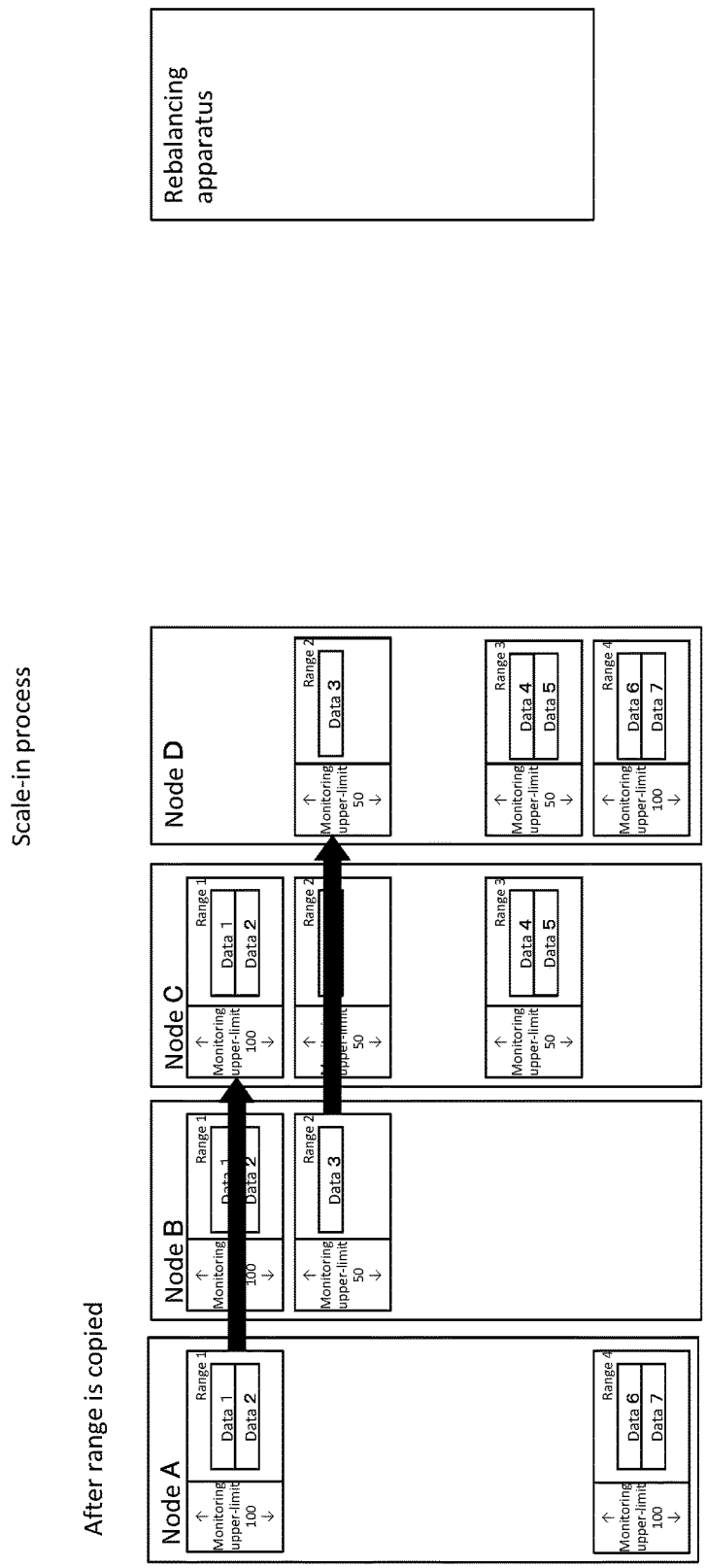
FIG. 20C is a diagram for describing an example of the scale-in process.
Figure 20D:
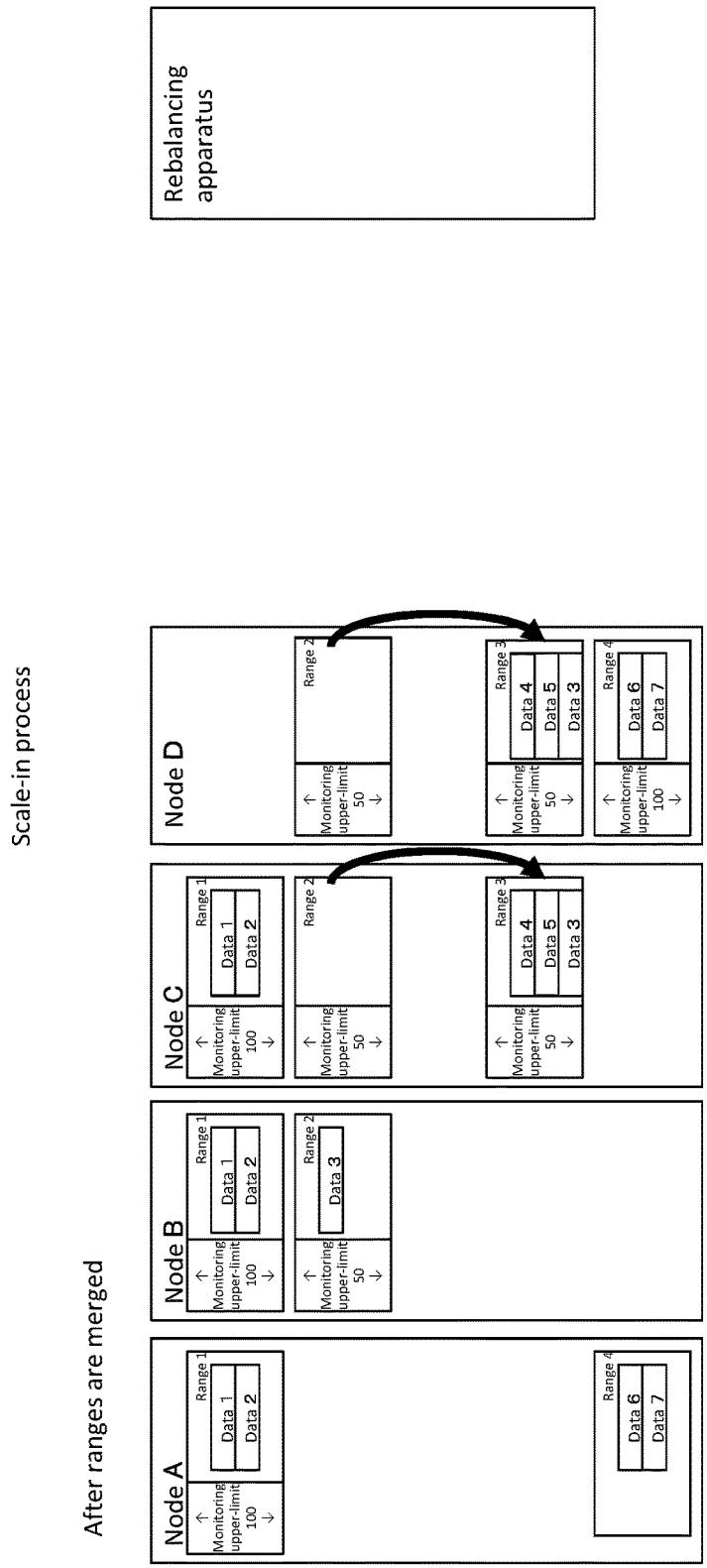
FIG. 20D is a diagram for describing an example of the scale-in process.
Figure 20E:
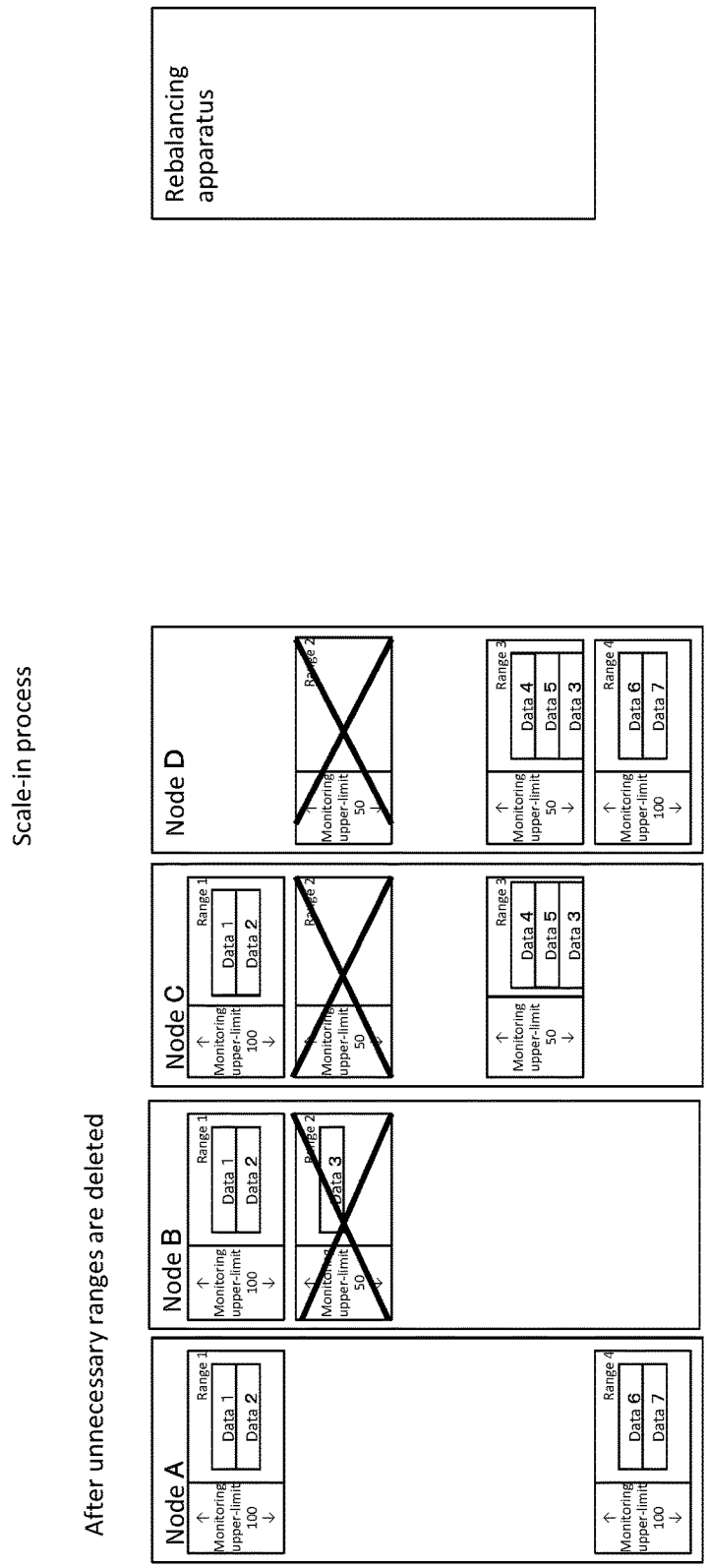
FIG. 20E is a diagram for describing an example of the scale-in process.
Figure 20F:
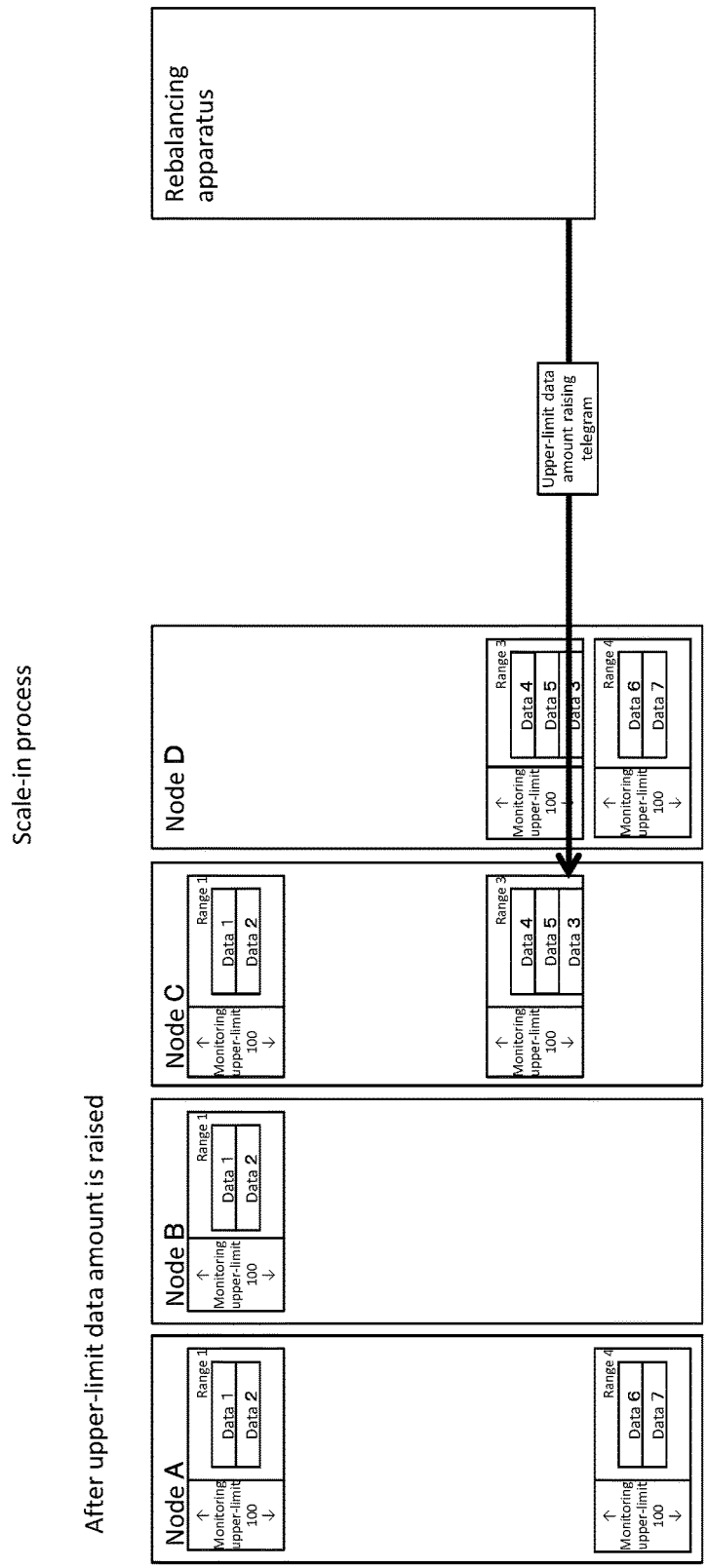
FIG. 20F is a diagram for describing an example of the scale-in process.
Figure 20G:
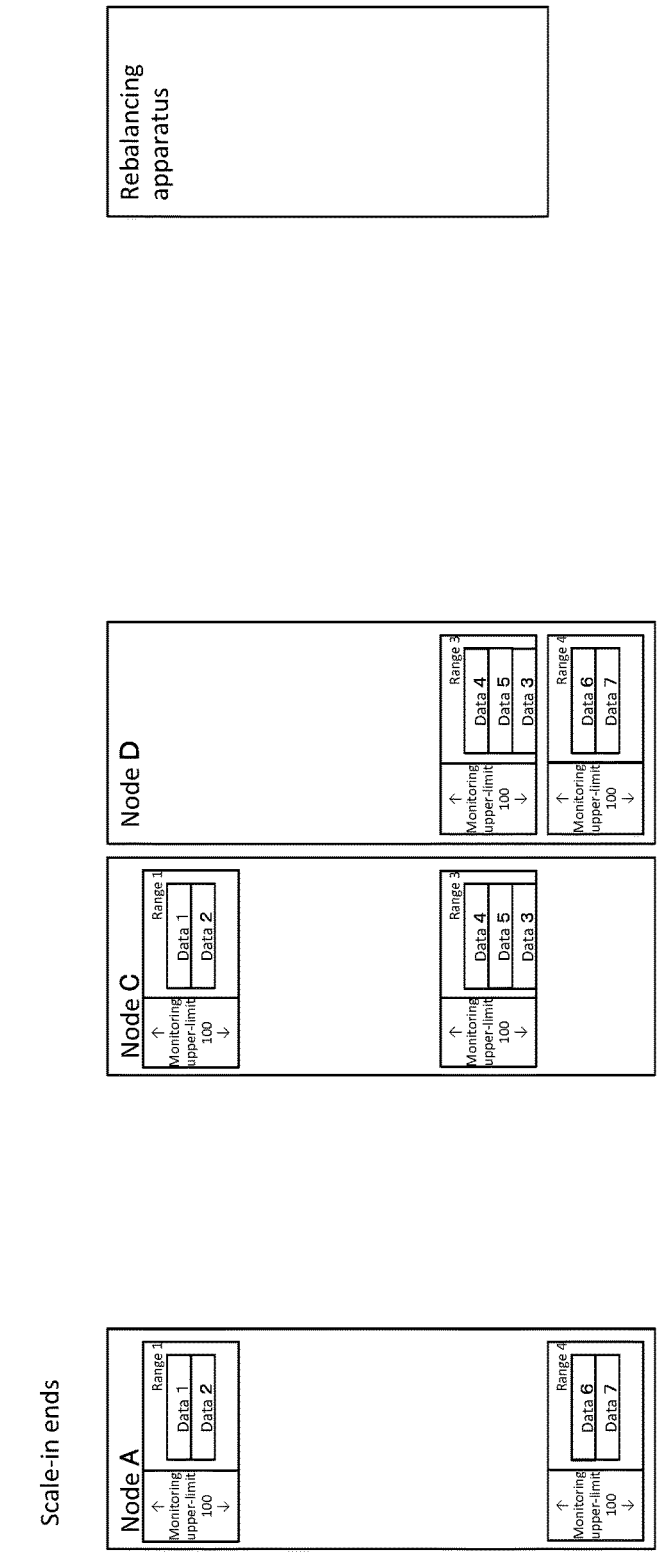
FIG. 20G is a diagram for describing an example of the scale-in process.

(FIG. 20C) In the process of S406, the source range 2 is copied to the node D that manages the destination range 3. In this case, although the ranges 2, 3, and 4 are present in the node D, since the monitoring upper limits of the ranges 3 and 4 in FIG. 20B are lowered to "50", the sum of the monitoring upper limits of these ranges does not exceed the maximum memory volume "200" of the node D. That is, resource overflow is prevented. The range 1 that manages the deletion target node B may be copied to the node C in order to secure redundancy.

(FIG. 20D) In the process of S408, the source range 2 is merged with the destination range 3.

(FIG. 20E) In the process of S410, the unnecessary source range 2 is deleted.

(FIG. 20F) In the process of S412, an upper-limit data amount raising telegram for the merging range 3 is transmitted and the monitoring upper limit of the amount of merging data is changed to "100". In this way, the monitoring upper limit of the destination range 3 which was lowered in FIG. 20B is restored.

(FIG. 20G) In the process of S414, the deletion target node B is deleted from the computer cluster.

FIGS. 21A to 21H are diagrams for describing an example in which duplicate execution of the telegram in the rebalancing process is prevented.

(FIG. 21A) In a configuration in which the node A manages the ranges 1 and 4, the node B manages the ranges 1 and 2, the node C manages the ranges 2 and 3, and the node D manages the ranges 3 and 4, a rebalancing process of allowing the rebalancing apparatus 20 of the current system to move a portion of the data in the range 3 to the range 2 is performed. It is assumed that the maximum memory volume of each node is "200" and the monitoring upper limit of each range is "100". In the process of S200 of the rebalancing apparatus 20 of the current system transmits a numbering telegram to the configuration management process 130.

(FIG. 21B) The configuration management process 130 having received the numbering telegram issues a processing number "1" and transmits the processing number "1" to the rebalancing apparatus 20 of the current system in the processes of S600 to S608. Moreover, the configuration management process 130 registers the issued processing number "1" in the number issuance information 400. The rebalancing apparatus 20 of the current system having received the processing number "1" stores the processing number "1".

(FIG. 21C) In the process of S206, of the rebalancing apparatus 20 of the current system, an upper-limit data amount lowering telegram (a telegram for changing the monitoring upper limit to "62") for the source range 2 and the destination range 3 including the processing number "1" is transmitted. Since the processing number 1 in the upper-limit data amount lowering telegram is the same as the processing number "1" that the configuration management process 130 has stored in the number issuance information 400 (the determination result in S702 is "YES"), the upper-limit data amount lowering telegram is executed. That is, the monitoring upper limit is changed to "62". The processing number "1" is correlated with the source range 2 and the destination range 3.

(FIG. 21D) Here, the alive monitoring apparatus 30 misjudges that the rebalancing apparatus 20 of the current system has stopped. An example of mis-judgement is a case in which the processing load of the rebalancing apparatus 20 of the current system is high and a PING response to the alive monitoring apparatus 30 is late (timed-out). In this case, the alive monitoring apparatus 30 instructs the rebalancing apparatus 20 of the standby system to switch processes.

Figure 21A:
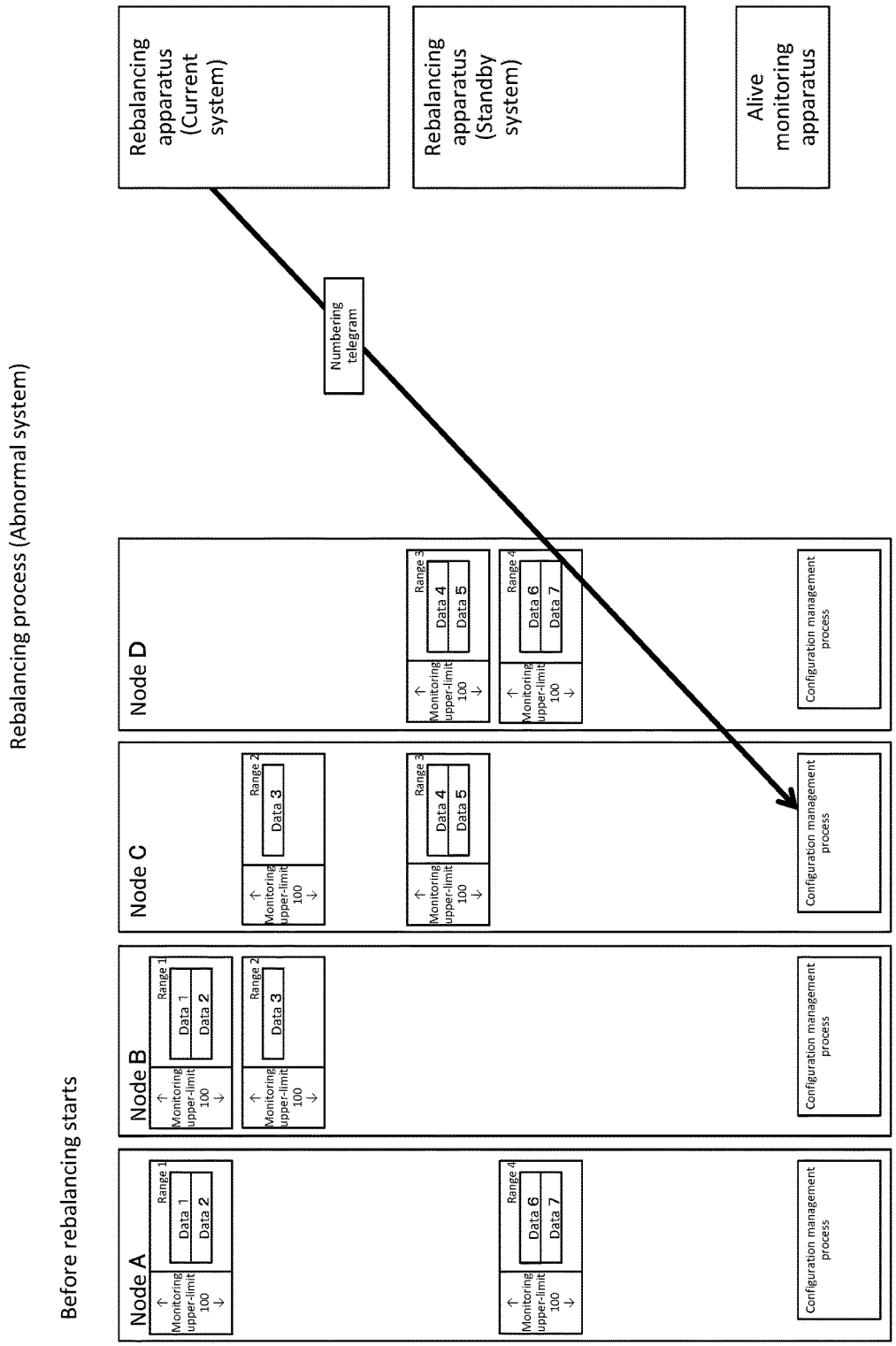
FIG. 21A is a diagram for describing a prevention example of duplicate execution of a telegram in the rebalancing process.
Figure 21B:
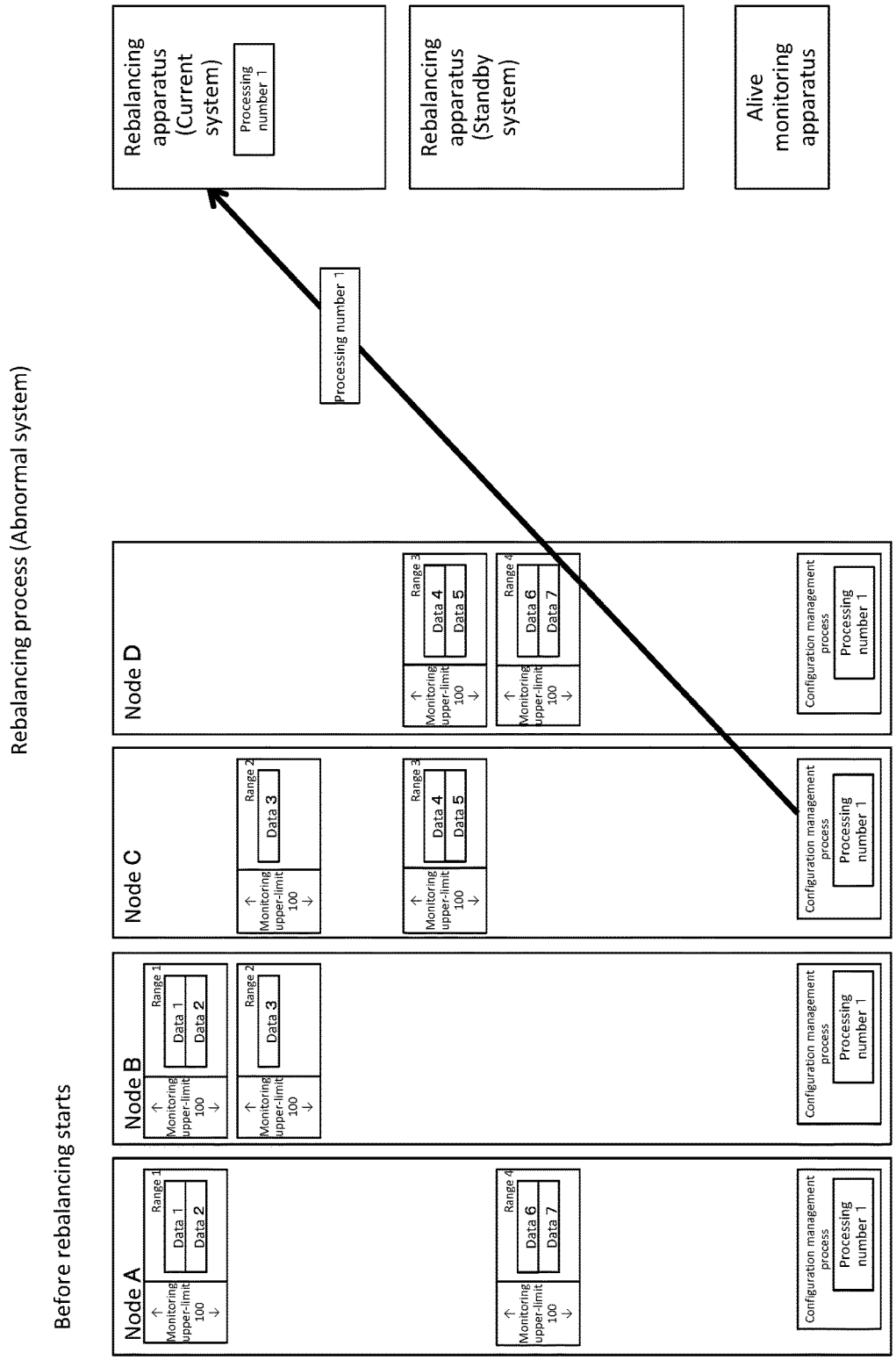
FIG. 21B is a diagram for describing a prevention example of duplicate execution of a telegram in the rebalancing process.

(FIG. 21E) Similarly to FIG. 21A, the rebalancing apparatus 20 of the standby system transmits a numbering telegram to the configuration management process 130. The number issuing unit 134 of the configuration management process 130 having received the numbering telegram issues a larger processing number "2" than the processing number "1" stored in the number issuance information 400, for example, and transmits the processing number "2" to the rebalancing apparatus 20 of the standby system. Moreover, the configuration management process 130 registers the issued processing number "2" in the number issuance information 400. The rebalancing apparatus 20 of the standby system having received the processing number "2" stores the processing number "2".

Figure 21C:
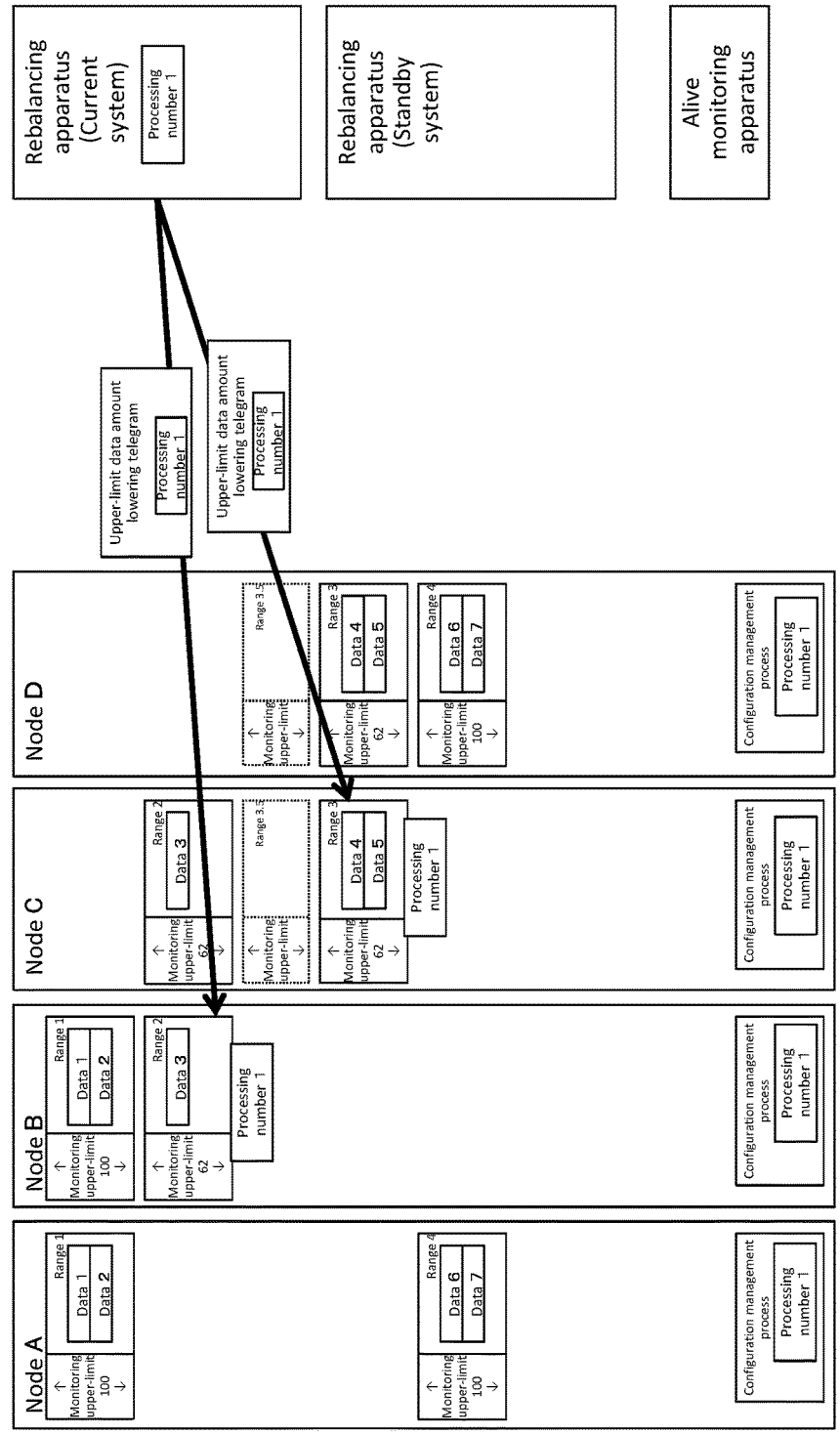
FIG. 21C is a diagram for describing a prevention example of duplicate execution of a telegram in the rebalancing process.
Figure 21D:
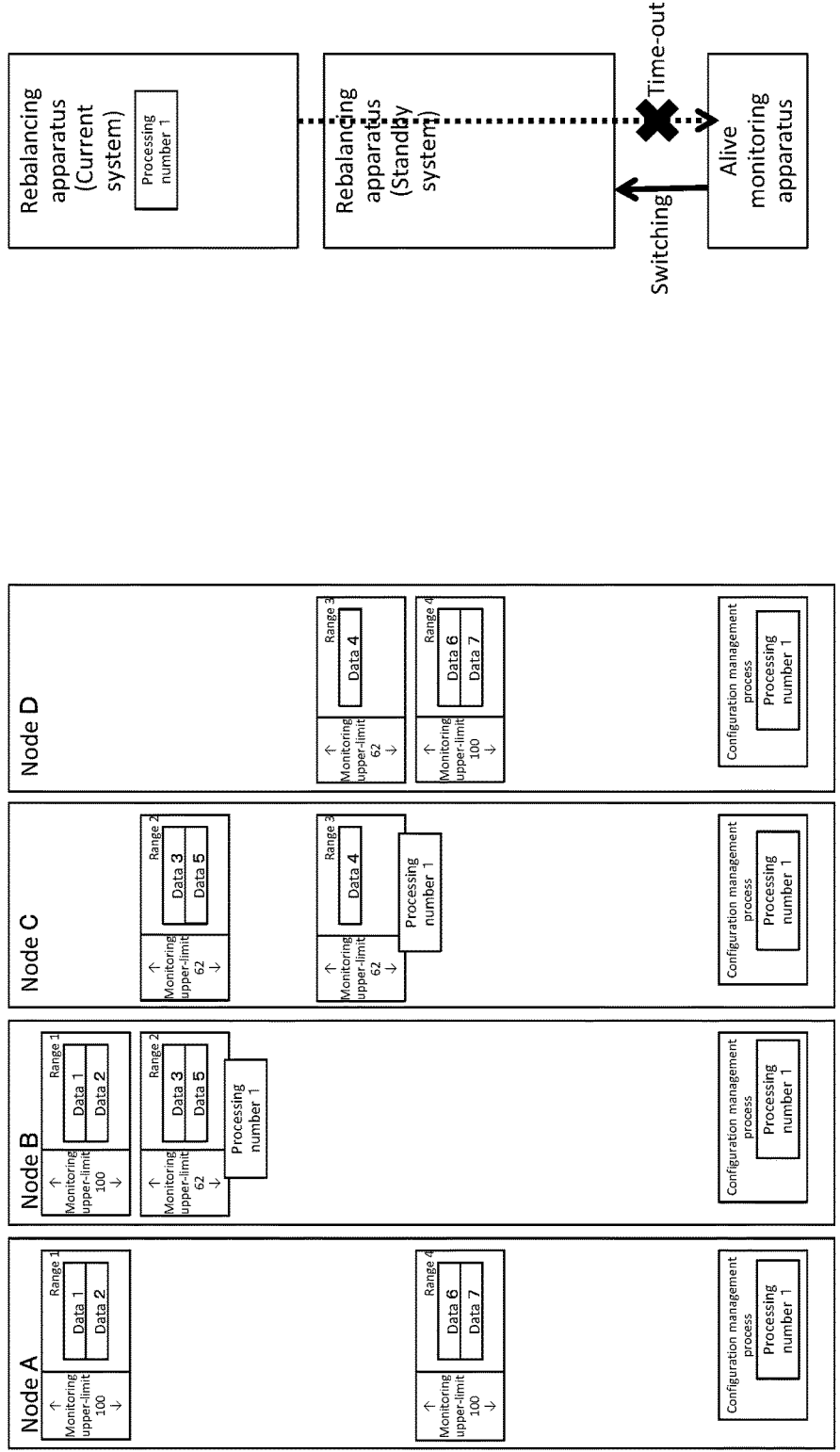
FIG. 21D is a diagram for describing a prevention example of duplicate execution of a telegram in the rebalancing process.
Figure 21E:
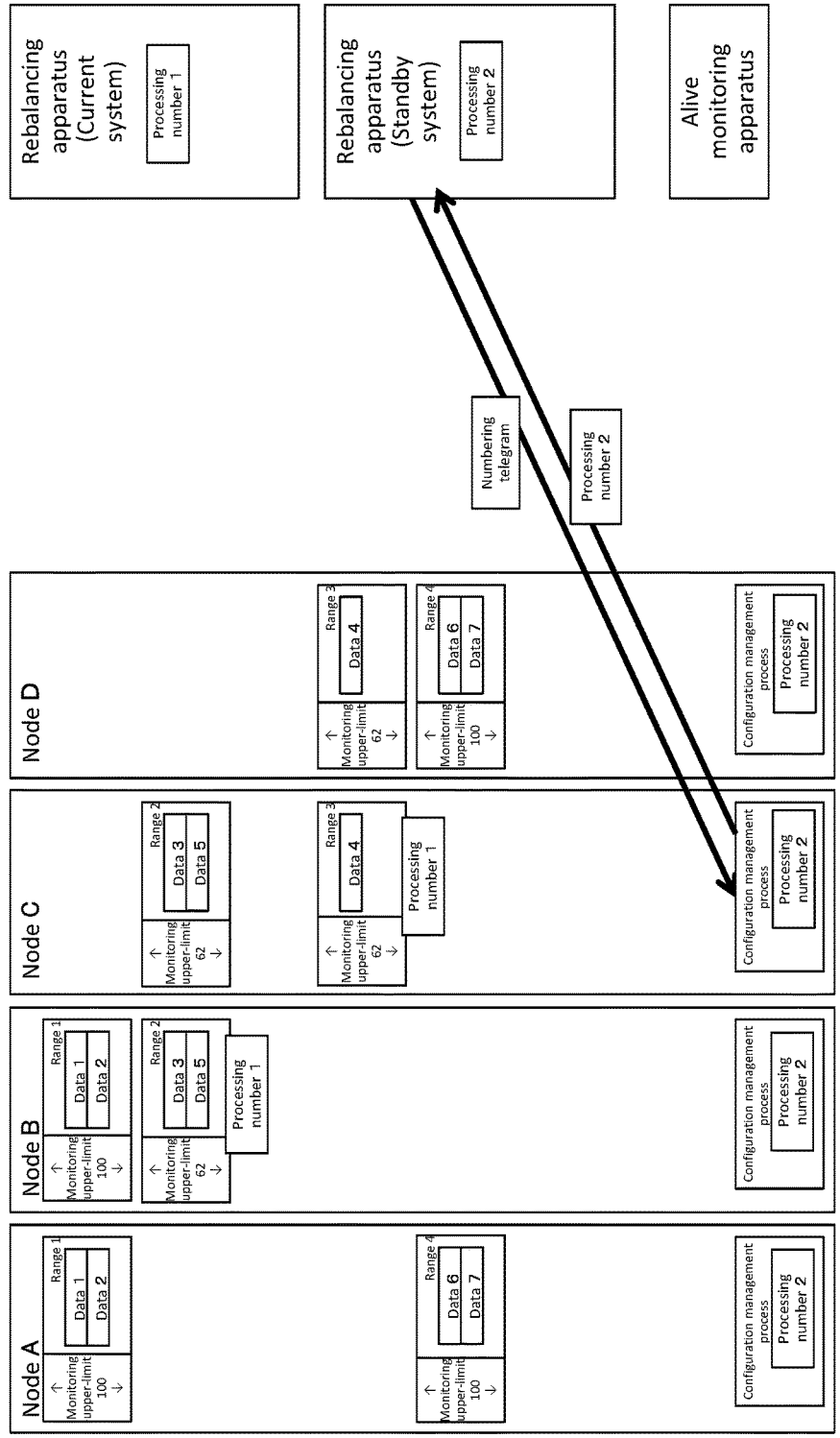
FIG. 21E is a diagram for describing a prevention example of duplicate execution of a telegram in the rebalancing process.

(FIG. 21F) In the process of S206, of the rebalancing apparatus 20 of the standby system, similarly to FIG. 21C, an upper-limit data amount lowering telegram (a telegram for changing the monitoring upper limit to "62") for the source range 2 and the destination range 3 including the stored processing number 2 is transmitted. The upper-limit data amount lowering telegram, which is given the processing number 2, is the same as that given the processing number 2, which the configuration management process 130 has stored in the number issuance information 400 (the determination result in S702 is "YES"), hence the upper-limit data amount lowering telegram is executed. That is, the monitoring upper limit is similarly changed to "62". The processing number "2" is correlated with the source range 2 and the destination range 3.

(FIG. 21G) Here, the rebalancing apparatus 20 of the current system which has not actually stopped tries to continuously perform the processes subsequent to S206 (that is, the processes of S208 to S216) performed in FIG. 21C. For example, as the process of S216, an upper-limit data amount raising telegram (a telegram for changing the monitoring upper limit to "100") for the source range 2 and the destination range 3, including the stored processing number "1" is transmitted. However, since the processing number "1" in the upper-limit data amount raising telegram is smaller than the processing number "2" correlated with the ranges 2 and 3 (the determination result in S702 is "NO"), the upper-limit data amount raising telegram is not executed. That is, duplicate execution of the telegram is prevented and the monitoring upper limit is still "62".

Figure 21F:
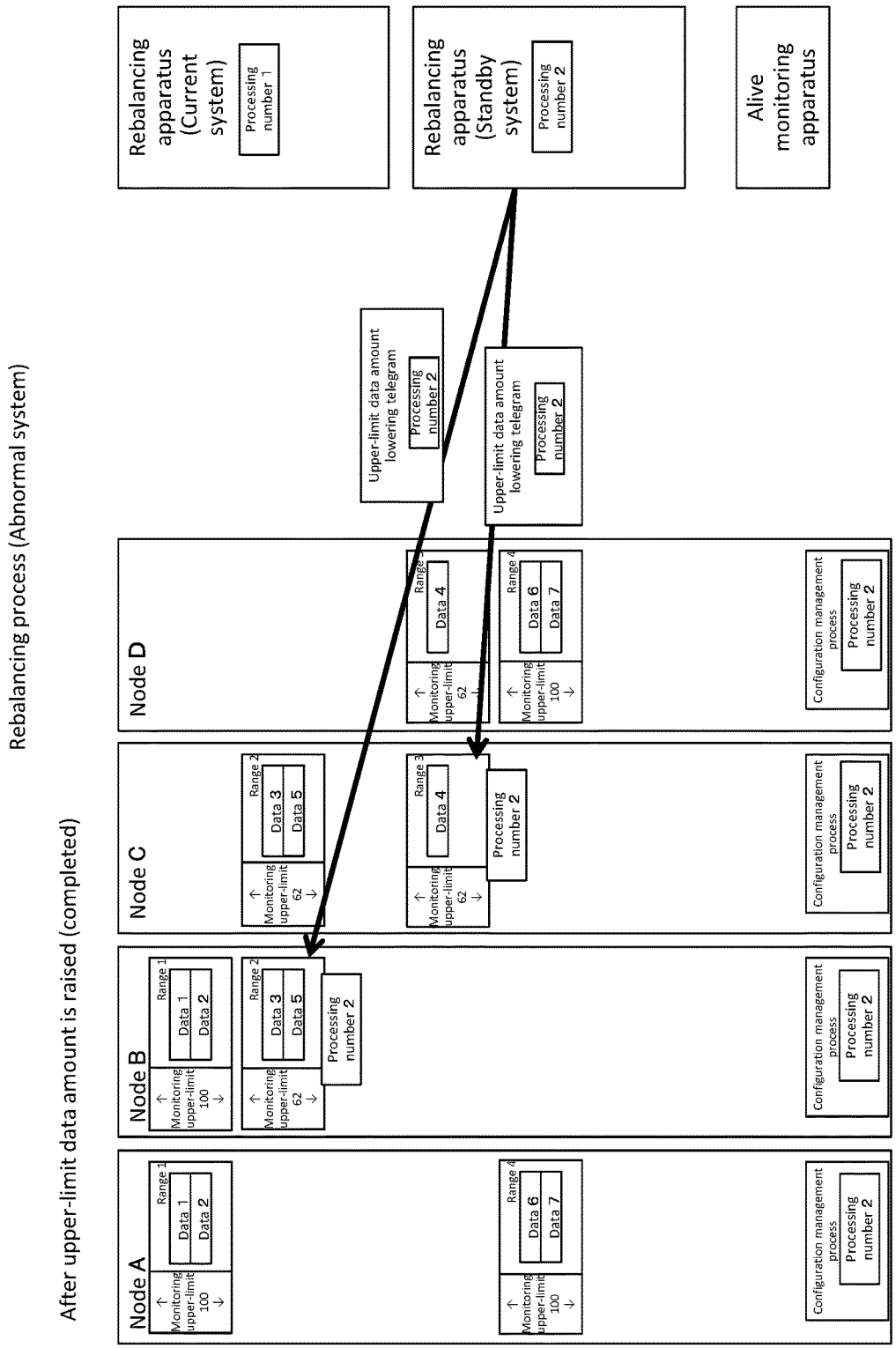
FIG. 21F is a diagram for describing a prevention example of duplicate execution of a telegram in the rebalancing process.
Figure 21G:
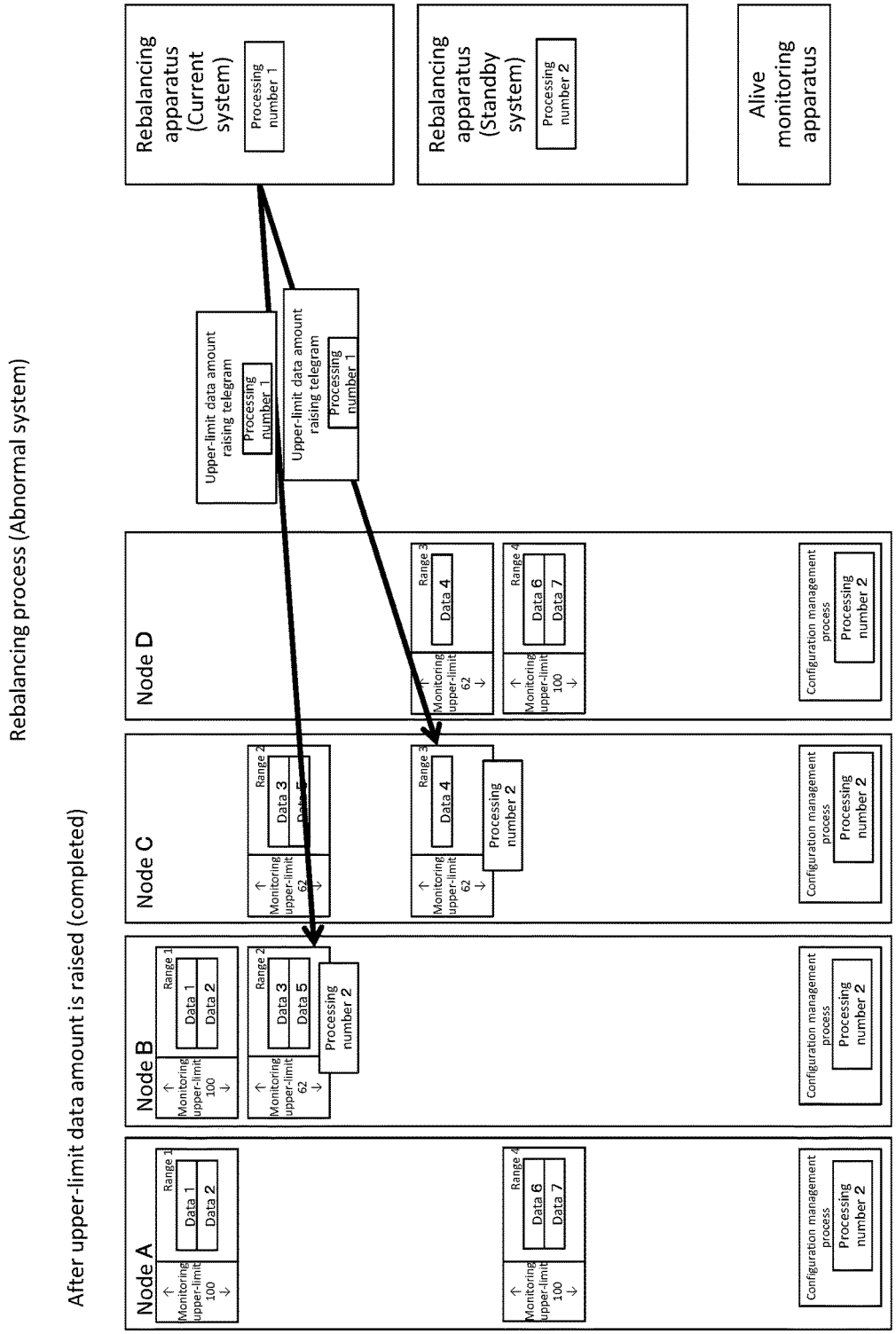
FIG. 21G is a diagram for describing a prevention example of duplicate execution of a telegram in the rebalancing process.
Figure 21H:
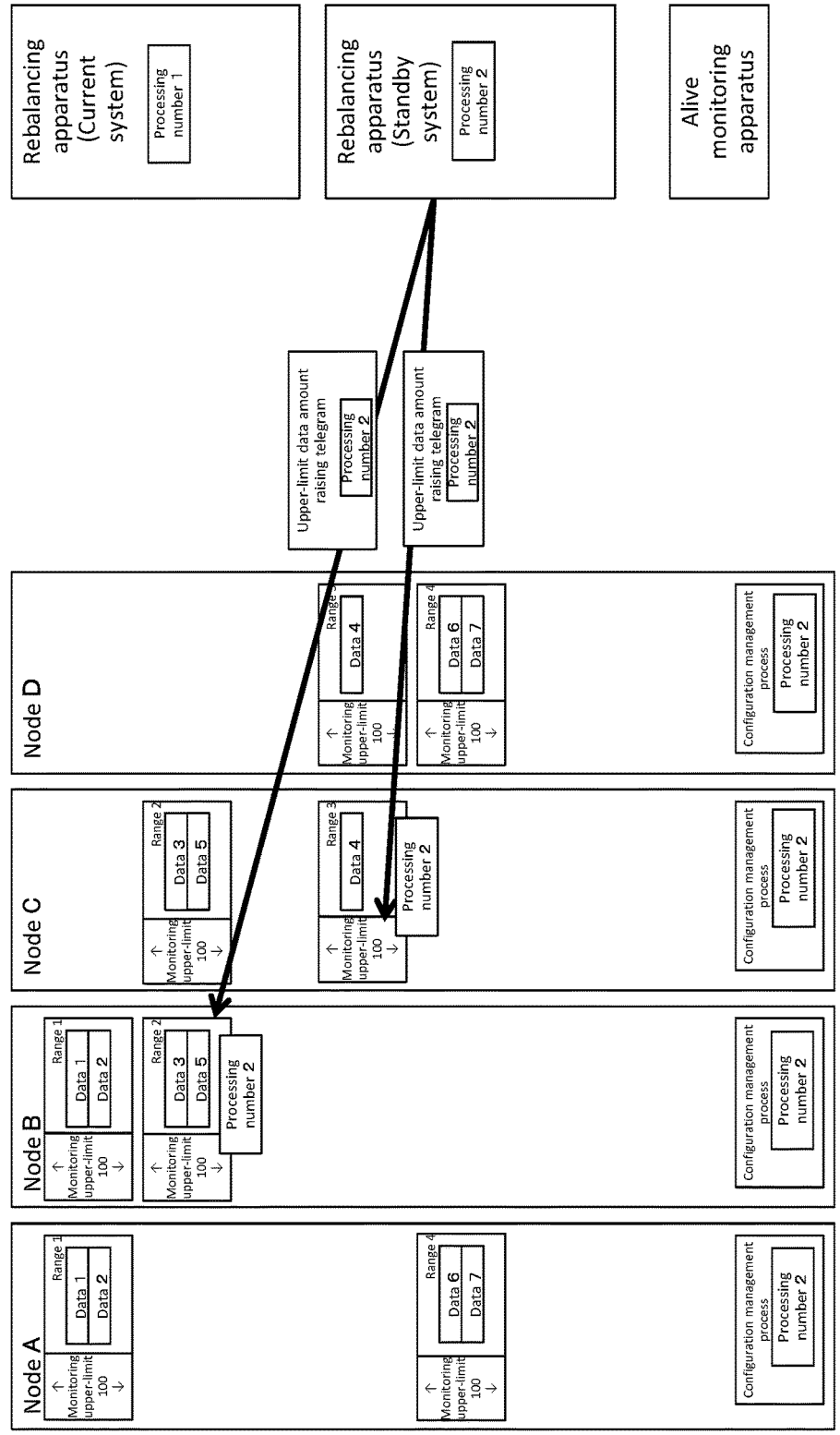
FIG. 21H is a diagram for describing a prevention example of duplicate execution of a telegram in the rebalancing process.

(FIG. 21H) On the other hand, the rebalancing apparatus 20 of the standby system tries to continuously perform processes subsequent to S206 (that is, the processes of S208 to S216) performed in FIG. 21F. For example, as the process of S216, an upper-limit data amount raising telegram (a telegram for changing the monitoring upper limit to "100") for the source range 2 and the destination range 3, including the stored processing number "2" is transmitted. Since the processing number "2" in the upper-limit data amount raising telegram is the same as the processing number "2" correlated with the ranges 2 and 3 (the determination result in S702 is "YES"), the upper-limit data amount raising telegram is executed. That is, the monitoring upper limit is changed to "100".

According to the above-described process, in the configuration in which the rebalancing apparatuses 20 of the current and standby systems are present, it is possible to prevent duplicate execution of the rebalancing process.

The embodiment of the present invention described above is an example to describe the present invention and the range of the present invention is not limited by the embodiment only. The present invention can be embodied in a variety of other aspects by those skilled in the art without departing from the scope of the present invention.

REFERENCE SIGNS LIST

10 Computer apparatus
20 Rebalancing apparatus
22 Scale-in apparatus
24 Scale-out apparatus
30 Alive monitoring apparatus
40 Client apparatus
110 Node 130 Configuration management process
170 Range process

The invention claimed is:

1. A computer system, comprising:
a plurality of computer apparatuses,
wherein each of the plurality of computer apparatuses comprise processors and memories and are configured to execute a plurality of nodes for forming a distributed KVS (key-value store),
wherein the plurality of nodes have a plurality of key ranges to which upper-limit data amounts are set, each upper-limit data amount being an upper limit of an amount of manageable data, and
wherein the plurality of nodes are configured to, when a new key range is created and before rebalancing of an amount of data among the nodes, lower an upper-limit data amount of an existing key range so that a sum of an upper-limit data amount of the new key range and an upper-limit data amount of the existing key range does not exceed a maximum amount, which is an amount based on a volume of the memory of the computer apparatus.

2. The computer system according to claim 1, wherein the plurality of nodes are configured to:
when the plurality of nodes performs a rebalancing process which is a process of changing the key ranges in case that unbalance exists in the amounts of data managed by each of the plurality of nodes,
after lowering the upper-limit data amounts of key ranges of a source and a destination for movement of data, split a portion of key range of the source to generate a new key range;
move a portion of a data in the key range of the source to the new key range;
copy the new key range to a node that manages the key range of the destination;
merge the copied new key range with the key range of the destination; and
raise the upper-limit data amounts of the key range of the source and merged key range.

3. The computer system according to claim 1, wherein the plurality of nodes are configured to:
when the plurality of nodes performs a scale-out process, which is a process of adding a new node, after lowering the upper-limit data amount of the key range of a source for movement of data,
split a portion of the key range of the source to generate a new key range;
move a portion of the data in the source key range to the new key range;
copy the new key range to a new node; and
raise the upper-limit data amounts of the key range of the source and the new key range.

4. The computer system according to claim 1, wherein the plurality of nodes are configured to:
when the plurality of nodes performs a scale-in process, which is a process of deleting an existing node,
after lowering the upper-limit data amounts of a destination key range and a source key range of a deletion target node,
copy the source key range to a node that manages the destination key range;
merge the copied source key range with the destination key range; and
raise the upper-limit data amount of merged key range.

5. The computer system according to claim 2, further comprising:
a rebalancing apparatus that issues an instruction on the rebalancing process to the plurality of nodes,
wherein a process of lowering and raising the upper-limit data amounts of the key ranges of the plurality of nodes is performed on the basis of the instruction issued from the rebalancing apparatus.

6. The computer system according to claim 5, wherein the plurality of nodes are configured to:
manage whether a state of the upper-limit data amount of the key range is an initial state, a lowering state, or a raising state,
upon receiving an instruction to lower the upper-limit data amount of the key range from the rebalancing apparatus, execute the instruction when the state of the upper-limit data amount of the key range is an initial state and unexecute the instruction when the state is not the initial state, and
upon receiving an instruction to raise the upper-limit data amount of the key range from the rebalancing apparatus, execute the instruction when the state of the upper-limit data amount of the key range is the initial state or the raising state and unexecute the instruction when the state of the upper-limit data amount of the key range is the raising state.

7. The computer system according to claim 5, wherein the plurality of nodes are configured to provide a processing number, corresponding to the rebalancing process, to the rebalancing apparatus,
the rebalancing apparatus is configured to includes the provided processing number in an instruction to the plurality of nodes,
the plurality of nodes are configured to:
manage a processing number executed last, and
execute the instruction when the processing number included in the instruction received from the rebalancing apparatus is equal to or larger than the processing number executed last, and unexecute the instruction when the processing number is smaller than the processing number executed last.

8. The computer system according to claim 5, wherein the instruction of raising or lowering the upper-limit data amount of the key range is delivered atomically between the plurality of nodes.

9. A data processing method executed by a computer system comprising a plurality of computer apparatuses that each include processors and memories and execute a plurality of nodes for forming a distributed KVS, the method comprising:
setting upper-limit data amounts to a plurality of key ranges of the plurality of nodes, each of the upper-limit data amounts being an upper limit of an amount of manageable data; and
when a new key range is created and before rebalancing of an amount of data among the nodes, lowering, by the plurality of nodes, an upper-limit data amount of an existing key range so that a sum of an upper-limit data amount of the new key range and an upper-limit data amount of the existing key range does not exceed a maximum amount, which is an amount based on a volume of a memory of the computer apparatus.

10. The data processing method according to claim 9, further comprising:
if the upper-limit data amount is not exceeded even if data in a data update telegram received by a node to update designated data is registered in the existing key range, then delivering the data update telegram to update the designated data.

11. The data processing method according to claim 9, further comprising, when the plurality of nodes performs a rebalancing process which is a process of changing the key ranges in case that unbalance exists in the amounts of data managed by each of the plurality of nodes, after lowering the upper-limit data amounts of key ranges of a source and a destination for movement of data:
- splitting a portion of key range of the source to generate a new key range;
- moving a portion of a data in the key range of the source to the new key range;
- copying the new key range to a node that manages the key range of the destination;
- merging the copied new key range with the key range of the destination; and
- raising the upper-limit data amounts of the key range of the source and merged key range.

12. The data processing method according to claim 11, wherein the computer system includes a rebalancing apparatus that issues an instruction on the rebalancing process to the plurality of nodes, the method further comprising:
- lowering and raising the upper-limit data amounts of the key ranges of the plurality of nodes is performed on the basis of the instruction issued from the rebalancing apparatus.

13. The data processing method according to claim 12, further comprising:
- managing whether a state of the upper-limit data amount of the key range is an initial state, a lowering state, or a raising state;
- upon receiving an instruction to lower the upper-limit data amount of the key range from the rebalancing apparatus, executing the instruction when the state of the upper-limit data amount of the key range is an initial state and unexecuting the instruction when the state is not the initial state; and
- upon receiving an instruction to raise the upper-limit data amount of the key range from the rebalancing apparatus, executing the instruction when the state of the upper-limit data amount of the key range is the initial state or the raising state and unexecuting the instruction when the state of the upper-limit data amount of the key range is the raising state.

14. The data processing method according to claim 12, further comprising:
- providing, by the plurality of nodes, a processing number, corresponding to the rebalancing process, to the rebalancing apparatus;
- including, by the rebalancing apparatus, the provided processing number in an instruction to the plurality of nodes;
- managing, by the plurality of nodes, a processing number executed last; and
- executing, by the plurality of nodes, the instruction when the processing number included in the instruction received from the rebalancing apparatus is equal to or larger than the processing number executed last, and unexecuting the instruction when the processing number is smaller than the processing number executed last.

15. The data processing method according to claim 12, further comprising:
- delivering the instruction of raising or lowering the upper-limit data amount of the key range atomically between the plurality of nodes.

16. The computer system according to claim 1, wherein the plurality of nodes are configured, if the upper-limit data amount is not exceeded even if data in a data update telegram received by a node to update designated data is registered in the existing key range, to deliver the data update telegram to update the designated data.

17. A computer system including:
a plurality of computer apparatuses;
wherein each of the plurality of computer apparatuses include processors and memories and are configured to execute a plurality of nodes for forming a distributed KVS (key-value store),
wherein the plurality of nodes have a plurality of key ranges to which upper-limit data amounts are set, each upper-limit data amount being an upper limit of an amount of manageable data,
wherein the plurality of nodes are configured to, when a new key range is created, lower an upper-limit data amount of an existing key range so that a sum of an upper-limit data amount of the new key range and an upper-limit data amount of the existing key range does not exceed a maximum amount, which is an amount based on a volume of the memory of the computer apparatus,
wherein the plurality of nodes are configured to, when the plurality of nodes performs a rebalancing process which is a process of changing the key ranges in case that unbalance exists in the amounts of data managed by each of the plurality of nodes, after lowering the upper-limit data amounts of key ranges of a source and a destination for movement of data, split a portion of key range of the source to generate a new key range, move a portion of a data in the key range of the source to the new key range, copy the new key range to a node that manages the key range of the destination, merge the copied new key range with the key range of the destination, and raise the upper-limit data amounts of the key range of the source and merged key range,
wherein the computer system further comprises a rebalancing apparatus that issues an instruction on the rebalancing process to the plurality of nodes, and
wherein a process of lowering and raising the upper-limit data amounts of the key ranges of the plurality of nodes is performed on the basis of the instruction issued from the rebalancing apparatus.

18. The computer system according to claim 17, wherein the plurality of nodes are configured to:
- manage whether a state of the upper-limit data amount of the key range is an initial state, a lowering state, or a raising state,
- upon receiving an instruction to lower the upper-limit data amount of the key range from the rebalancing apparatus, execute the instruction when the state of the upper-limit data amount of the key range is an initial state and unexecute the instruction when the state is not the initial state, and
- upon receiving an instruction to raise the upper-limit data amount of the key range from the rebalancing apparatus, execute the instruction when the state of the upper-limit data amount of the key range is the initial state or the raising state and unexecute the instruction when the state of the upper-limit data amount of the key range is the raising state.

19. The computer system according to claim 17, wherein the plurality of nodes are configured to provide a processing number, corresponding to the rebalancing process, to the rebalancing apparatus, the rebalancing apparatus is configured to includes the provided processing number in an instruction to the plurality of nodes, the plurality of nodes are configured to:
  manage a processing number executed last, and
  execute the instruction when the processing number included in the instruction received from the rebalancing apparatus is equal to or larger than the processing number executed last, and unexecute the instruction when the processing number is smaller than the processing number executed last.

20. The computer system according to claim 17, wherein the instruction of raising or lowering the upper-limit data amount of the key range is delivered atomically between the plurality of nodes.

* * * * *